United States Patent [19]

Bradley

[11] E Patent Number: Re. 32,201

[45] Reissued Date of Patent: Jul. 8, 1986

[54] APPARATUS AND METHOD FOR READING AND WRITING TEXT CHARACTERS IN A GRAPHICS DISPLAY

[75] Inventor: David J. Bradley, Boca Raton, Fla.

[73] Assignee: International Business Machines Corporation, Armonk, N.Y.

[21] Appl. No.: 638,340

[22] Filed: Aug. 6, 1984

Related U.S. Patent Documents

Reissue of:

[64] Patent No.: 4,408,200
Issued: Oct. 4, 1983
Appl. No.: 292,084
Filed: Aug. 12, 1981

[51] Int. Cl.[4] ..... G09G 1/28

[52] U.S. Cl. ..... 340/747; 340/703; 340/750

[58] Field of Search ..... 340/825.3, 747, 750, 340/703; 382/56

[56] References Cited

U.S. PATENT DOCUMENTS 3,778,810 12/1973 Hayashi ..... 340/747
3,906,480 9/1975 Schwartz et al. ..... 340/747 X
4,149,145 4/1979 Hartke et al. ..... 340/739
4,225,861 9/1980 Langdon et al. ..... 340/703
4,283,724 8/1981 Edwards ..... 340/731

*Primary Examiner*—David L. Trafton
*Attorney, Agent, or Firm*—Sughrue, Mion, Zinn, Macpeak, and Seas

[57] ABSTRACT

Apparatus and method for writing text characters to a raster scan video display operted in an all-points-addressable, or graphics, mode, and for reading characters thus written. A graphic video display buffer directly refreshes the display with graphics data received from a microprogrammed processor. The processor writes a character to the display by selecting and loading into the graphics video display buffer a text character dot pattern retrieved from main storage, and reads a character previously written by comparing a dot pattern retrieved from the display buffer with dot patterns retrieved from main storage. To write a character to the display in color, the graphic dot image of a selected character retrieved from main storage is expanded to a selected pixel and color format, and stored in the graphics video display buffer. Text characters thus written in color are read by retrieving from the display buffer the expanded dot image, restoring the expanded dot image to its original form, and comparing the restored dot image with graphic dot images retrieved from storage.

18 Claims, 13 Drawing Figures

APPARATUS AND METHOD FOR READING AND WRITING TEXT CHARACTERS IN A GRAPHICS DISPLAY

Matter enclosed in heavy brackets [ ] appears in the original patent but forms no part of this reissue specification; matter printed in italics indicates the additions made by reissue.

BACKGROUND OF THE INVENTION

1. Field of the Invention

This invention relates to display systems and, more particularly, to a system for reading and writing text characters in a color graphics raster scan, all points addressable video display.

2. Discussion of the Prior Art

A video display typically provides an interface between a data processing machine and a user. Generally, a video image may comprise either strings of characters or of graphics, each of which requires different storage and, heretofore, processing requirements. Because of these differing requirements, many prior art video display systems do not permit the combining of text and graphic data on the same screen. However, many applications of graphic displays would be greatly enhanced by the provision of character data, such as legends on charts or graphs.

U.S. Pat. No. 4,149,145 describes a video display permitting the placement of character data within the region of display of graphic information. This is done by combining both graphic and character data in a video register. Each of the graphic and character data are separately developed, with a character generator providing the character image components and a graphic generator providing the graphic image components. These two components are merged or superimposed to provide a composite video signal. However, in the system of U.S. Pat. No. 4,149,145, there is no provision for reading text characters from the composite signal, and unnecessary complexity is required by the use of separate text character and graphics generators.

SUMMARY OF THE INVENTION

The invention provides apparatus and method for writing text characters to a raster scan video display operated in the graphics mode, and for reading characters thus written.

The apparatus of the invention includes a graphic video display buffer operable in an all points addressable mode for refreshing the display with graphics data, and a processor for loading the graphic data into said graphics video display buffer. The improvement comprises programmable control means referenced by said processor for writing by selecting and loading into said graphics video display buffer a text character dot pattern from main storage, and for reading by comparing dot patterns read from said display buffer with dot patterns in said main storage.

According to the method of the invention, text characters are written to a raster scan, all points addressable video display by retrieving from storage the graphic dot image of a selected character, expanding the graphic dot image to a selected pixel and color format, and storing the expanded dot image in a graphics video display buffer. Text characters are read by retrieving from the display buffer expanded dot images, restoring the expanded dot image to its original form, and comparing the restored dot image with graphic dot images selected from storage.

DESCRIPTION OF THE PREFERRED EMBODIMENTS

Figure 1:
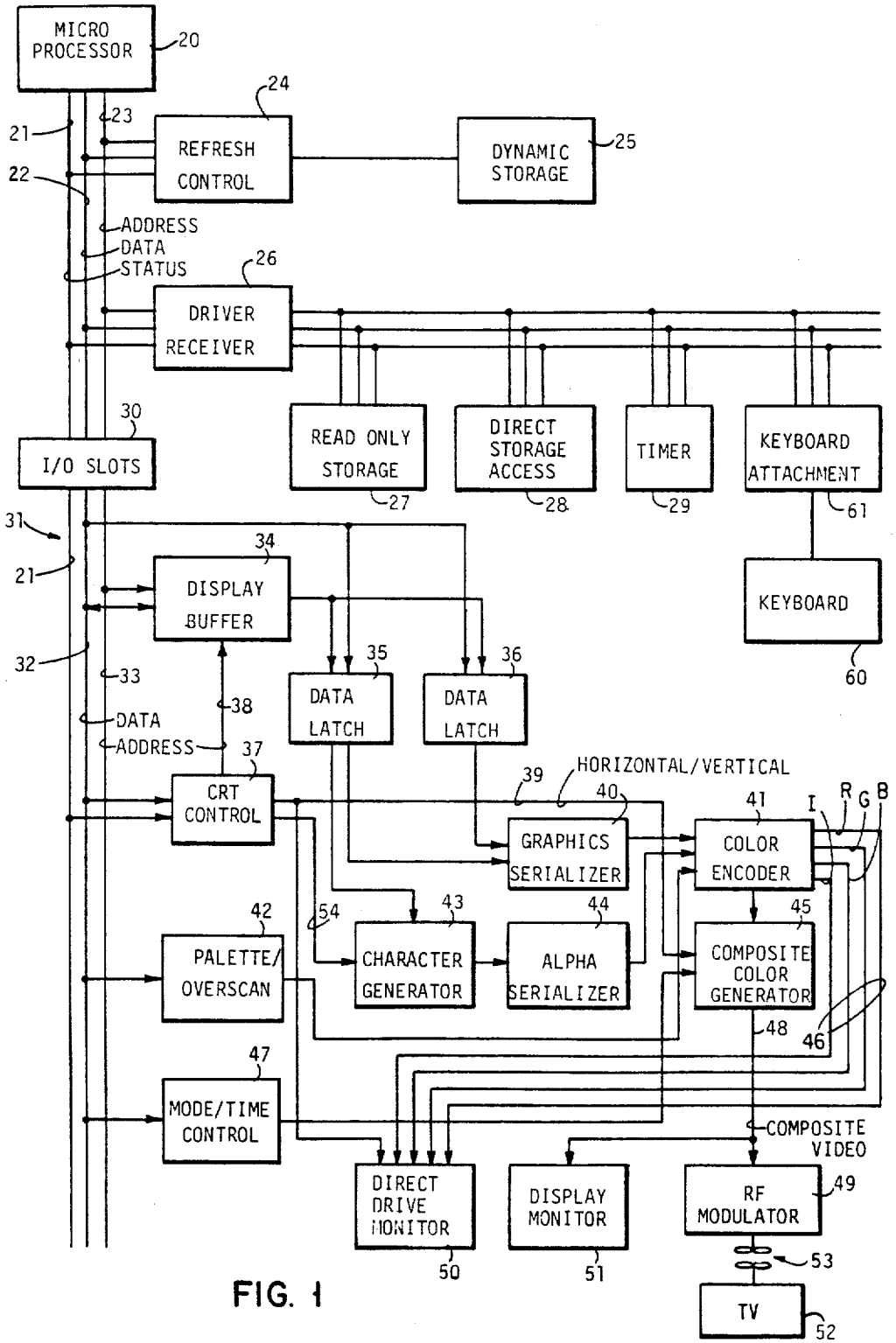
FIG. 1 is a logic schematic illustrating the video display control apparatus of the invention.

Referring now to FIG. 1, a description will be given of the apparatus of the invention for reading and writing text characters in a color graphics display.

The display of the invention is particularly suited for use in connection with a microcomputer including microprocessor 20, dynamic storage 25, read only storage 27, display 50, and keyboard 60. In this embodiment, microprocessor 20 may comprise an Intel 8088 CPU, which utilizes the same 16-bit internal architecture as the Intel 8086 CPU but has an external 8-bit data bus 22. For a description of the Intel 8086, and consequently of the 8086 instruction set used in the microprogram assembly language descriptions of the invention set forth hereafter, reference is made to Stephan P. Morse, The 8086 Primer, Hayden Book Company Inc., Rochelle Park, N.J., copyright 1980, Library of Congress classification QA76.8.1292M67 001.6'4'04 79-23932 ISBN 0-8104-5165-4, the teachings of which are herein incorporated by reference.

Processor 20 communicates with devices external to its integrated circuit chip via status and control line 21, data bus 22, and address bus 23. Such external devices include dynamic storage 25 (for example, Texas Instruments 4116 RAM) with refresh control 24 (for example, an Intel 8237 DMA driven by an Intel 8253 Timer); and, connected by drivers/receivers 26 (for example, a TTL standard part 74LS245), read only storage 27 (for example, a MOSTEK 36000), direct storage access (or DMA) chip 28 (for example, and Intel 8237 DMA), timer 29 (for example, an Intel 8253 Timer implemented as described in "Refresh Circuit for Dynamic Memory of Data Processor Employing a Direct Memory Access Controller," by James A. Brewer, et al, U.S. patent application Ser. No. 292,075, filed Aug. 12, 1981) and keyboard attachment 66 with keyboard 67.

Input/Output slots 30 provide for the attachment of a further plurality of external devices, one of which, the color graphic display attachment 31 is illustrated. Color graphics display adapter 31 attaches one or more of a wide variety of TV frequency monitor 50, 51 and TV sets 52, with an RF modulator 49 required for attaching a TV via antenna 53. Adapter 31 is capable of operating in black and white or color, and herein provides these video interfaces: a composite video port on line 48, which may be directly attached to display monitor 51 or to RF modulator 49, and a direct drive port comprising lines 39 and 46.

Herein, display buffer 34 (such as an Intel 2118 RAM) resides in the address space of controller 20 starting at address X'B8000'. It provides in 16K bytes of dynamic RAM storage a raster scan bit map. A dual-ported implementation allows CPU 20 and graphics control unit 37 to access buffer 34.

An APA mode, two resolution modes will be described: APA color 320×200 (320 pixels per row, 200 rows per screen) mode and APA black and white 640×200 mode. In 320×200 mode, each pixel may have one of four colors. The background color (color 00) may be any of the sixteen possible colors. The remaining three colors come from one of two palettes in palette 42 selected by microprocessor 20 under control of read only storage 27 program: one palette containing red (color 01), green (color 10), and yellow (color 11), and the other palette containing cyan (color 01), magenta (color 10), and white (color 11). The 640×200 mode is, in the embodiment described, available only in two colors, such as black and white, since the full 16KB of storage in display buffer 34 is used to define the pixels on or off state.

In A/N mode, characters are formed from ROS character generator 43, which herein may contain dot patterns for 254 characters. These are serialized by alpha serializer 44 into color encoder 41 for output to port lines 46 or via lines 48 to composite color generator 48 for output to composite video line 48.

Display adapter 31 includes a CRT control module 37, which provides the necessary interface to processor 20 to drive a raster scan CRT 50–52. Herein, CRT control module 37 comprises a Motorola MC6845 CRT controller (CRTC) which provides video timing on horizontal/vertical line 39 and refresh display buffer addressing on lines 38. The Motorola MC6845 CRTC is described in MC6845 MOS (N-channel, Silicon-Gate) CRT controller, Motorola Simiconductor's publication ADI-465, copyright Motorola, Inc., 1977.

As shown in FIG. 1, the primary function of CRTC 37 is to generate refresh addresses (MA0–MA13) on line 38, row selects (RAO–RA4) on line 54, video monitor timing (HSYNC, VSYNC) on line 39, and display enable (not shown). Other functions include an internal cursor register which generates a cursor output (not shown) when its content compares to the current refresh address 38. A light-pen strobe input signal (not shown) allows capture of refresh address in an internal light pen register.

All timing in CRTC 37 is derived from a clock input (not shown). Processor 20 communicates with CRTC 37 through buffered 8-bit data bus 32 by reading/writing into an 18-register file of CRTC 37.

The refresh memory 34 address is multiplexed between processor 20 and CRTC 37. Data appears on a secondary bus 32 which is buffered from the processor primary bus 22. A number of approaches are possible for solving contentions for display buffer 34:

(1) Processor 20 always gets priority.

(2) Processor 20 gets priority access any time, but can be synchronized by an interrupt to perform accesses only during horizontal and vertical retrace times.

(3) Synchronize process by memory wait cycles.

(4) Synchronize processor 20 to character rate.

The secondary data bus concept in no way precludes using the display buffer 34 for other purposes. It looks like any other RAM to processor 20. For example, using approach 4, a 64K RAM buffer 34 could perform refresh and program storage functions transparently.

CRTC 37 interfaces to processor 20 on bidirectional data bus 32 (DO–D7) using Intel 8088 CS, RS, E, and R/W control lines 21 for control signals.

The bidirectional data lines 32 (DO–D7) allow data transfers between the CRTC 37 internal register file and processor 20.

The enable (E) signal on lines 21 is a high impedance TTL/MOS compatible input which enables the data bus input/output buffers and clocks data to and from CRTC 37. This signal is usually derived from the processor 20 clock.

The chip select (CS) line 21 is a high impedance TTL/MOS compatible input which selects CRTC 37 when low to read or write the CRTC 37 internal register file. This signal should only be active when there is a valid stable address being decoded on bus 33 from processor 20.

The register select (RS) line 21 is a high impedance TTL/MOS compatible input which selects either the address register (RS='0') or one of the data registers (RS='1') of the internal register file of CRTC 37.

The read/write (R/W) line is a high impedance TTL/MOS compatible input which determines whether the internal register file in CRTC 37 gets written or read. A write is active low ('0').

CRTC 37 provides horizontal sync (HS/vertical sync (VS) signals on lines 39, and display enable signals.

Vertical sync is a TTL compatible output providing an active high signal which drives monitor 50 directly or is fed to video processing logic 45 for composite generation. This signal determines the vertical position of the displayed text.

Horizontal sync is a TTL compatible output providing an active high signal which drives monitor 50 directly or is fed to video processing logic 45 for composite generation. This signal determines the horizontal position of the displayed text.

Display enable is a TTL compatible output providing an active high signal which indicates CRTC 37 is providing addressing in the active display area of buffer 34.

CRTC 37 provides memory address 38 (MA0–MA13) to scan display buffer 34. Also provided are raster addresses (RA0–RA4) for the character ROM.

Refresh memory 34 address (MA0–MA13) provides 14 outputs used to refresh the CRT screen 50–52 with pages of data located within a 16K block of refresh memory 34.

Raster addresses 54 (RA0–RA4) provides 5 outputs from the internal raster counter to address the character ROM 43 for the row of a character.

Palette/overscan 42 and mode select 47 are implemented as a general purpose programmable I/O register. Its function in attachment 31 is to provide mode selection and color selection in the medium resolution color graphics mode.

Time control 47 further generates the timing signals used by CRT controller 37 and by dynamic RAM 34. It also resolves the CPU 20 graphic controller 37 contentions for accessing display buffer 34.

An A/N mode, attachment 31 utilizes ROS (for example, a MOSTEK 36000 ROS) character generator 43, which consists of 8K bytes of storage which cannot be read/written under software control. The output of character generator is fed to alpha serializer 44 (such as a standard 74 LS 166 shift register), and thence to color encoder 41. As elements 43, 44 are included only for completeness, they are not utilized in the invention and will not be further described.

The output of display buffer 34 is alternatively fed for every other display row in a ping pong manner through data latches 35, 36 to graphics serializer 40, and thence to color encoder 41. Data latches 35, 36 may be implemented as standard TTL 74 LS 244 latches, graphics serializer 40 as a standard TTL 74 LS 166 shift register. Color encoder 41 may be implemented in logic such as is described in M. A. Dean, et al, "Composite Video Color Signal Generator From Digital Color Signals", assignees Ser. No. 292,074, 8-1981, of common assignee as the present invention. Composite color generator 45 provides logic for generating composite video 48, which is base band video color information.

Figure 2:
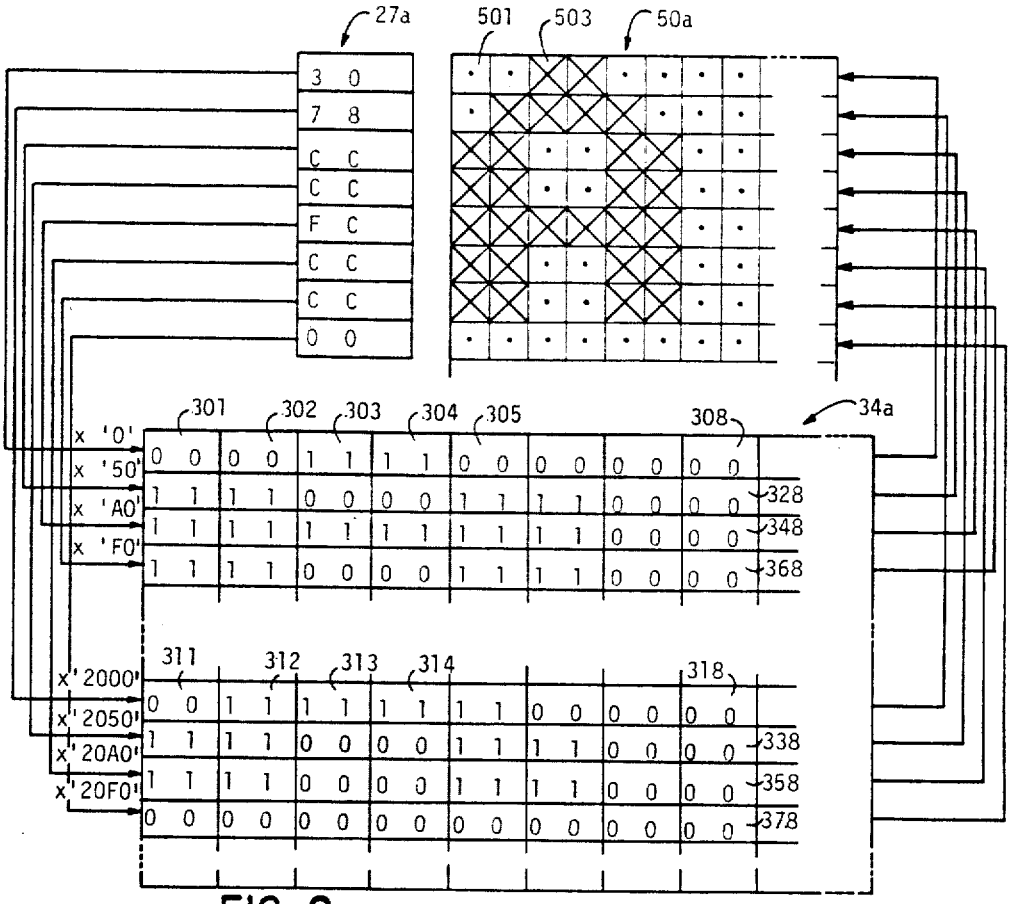
FIG. 2 is a schematic illustration of the relationships between pixel display and storage locations.

The organization of display buffer 34 to support the 200×320 color graphics mode is illustrated in FIG. 2 for generating, by way of example, a capital A in the upper left-hand position 50a of monitor 50. Read only storage 27 stores for each character displayable in graphics mode an eight byte code, shown at 27a as sixteen hexidecimal digits 3078CCCCFCCCCCOO. In FIG. 2, these are organized in pairs, each pair describing one row of an 8×8 matrix on display 50a. In display 50a, an "X" in a pixel location denotes display of the foreground color (herein, code 11) and a "." denotes display of the background color (code 00).

When the character "A" is to be displayed, the sixteen digit hex code from read only storage 27 (or, equivalently, from dynamic storage 25) is, in effect converted to binary. Thus, the first 8 pixel row, 30 hex, becomes 00110000, in binary. This eight bit binary code is then expanded to specify color, with each "0" becoming "00" to represent the background color, and each "1" becoming 10, 01, or 11 to specify one of the three foreground colors from the selected palette. In FIG. 2, each "1" in the binary representation of the character code from storage 27 becomes "11" (which for palette two represents yellow; see below). Thus, the hex 30 representation of the first 8-pixel row of character "A", is expanded to 00 00 11 11 00 00 00 00 in display buffer 34a, shown at location '0' (in hexidecimal notation, denoted as x '0'). Graphics storage 34 is organized in two banks of 8000 bytes each, as illustrated in Table 1, where address x '0000' contains the pixel information (301–304) for the upper left corner of the display area, and address x '2000' contains the pixel information for the first four pixels (311–314) of thesecond row of the display (in this case, the first 8 bit byte of the two byte binary expansion 00 11 11 11 11 00 00 00 of hex 78).

TABLE 1

DISPLAY BUFFER 34 ADDRESSING

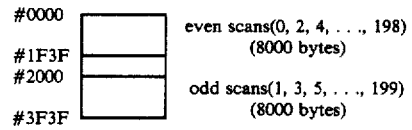

For the 200×640 mode (black and white), addressing and mapping of display buffer 34 to display 50 is the same as for 200×320 color graphics, but the data format is different: each bit in buffer 34 is mapped to a pixel on screen 50 (with a binary 1 indicating, say, black; and binary 0, white).

Color encoder 41 output lines 46I (intensity), R (red), G (green), B (blue), provide the available colors set forth in Table 2:

TABLE 2

| COLOR ENCODER OUTPUT 46 | | | | |
|---|---|---|---|---|
| I | R | G | B | COLOR |
| 0 | 0 | 0 | 0 | Black |
| 0 | 0 | 0 | 1 | Blue |
| 0 | 0 | 1 | 0 | Green |
| 0 | 0 | 1 | 1 | Cyan |
| 0 | 1 | 0 | 0 | Red |
| 0 | 1 | 0 | 1 | Magenta |
| 0 | 1 | 1 | 0 | Brown |
| 0 | 1 | 1 | 1 | Light Gray |
| 1 | 0 | 0 | 0 | Dark Gray |
| 1 | 0 | 0 | 1 | Light Blue |
| 1 | 0 | 1 | 0 | Light Green |
| 1 | 0 | 1 | 1 | Light Cyan |
| 1 | 1 | 0 | 0 | Light Red |
| 1 | 1 | 0 | 1 | Light Magenta |
| 1 | 1 | 1 | 0 | Yellow |
| 1 | 1 | 1 | 1 | White |

Referring now to FIGS. 4–9, in connection with the Intel 8086 assembly language (ASM-86) listings embedded in microcode in read only storage 27, executed in microprocessor 20 to control the operation of video attachment 31, and set forth in Tables 3 through 12, a description will be given of the method of the invention for writing text characters to a video screen operating in APA, or graphics mode. The Intel 8086 architecture and ASM-86 language is explained in Morse, The 8088 Primer, supra.

In Table 3 is set forth the preamble and various initialization procedures to the Graphics Read/Write Character microprogram in ROS 27. While the control program, in this embodiment, is shown stored in a read only store 27, it is apparent that such could be stored in a dynamic storage, such as storage 25.

In step 400, a data location in RAM 25 is tested to determine if the system is graphics write mode. If not, and a character is to be written, a branch to normal A/N character mode 402 is taken and the method of the invention bypassed.

Table 4 sets forth the 8086 assembly language listing for the graphics write steps, Table 5 the high resolution (black and white, or 640×200) mode thereof, and Table 6 the medium resolution (color, or 320×200) mode.

In step 404, lines 53–57 of Table 4, addressability to the display buffer is established: the location in display buffer (REGEN) 34 to receive the write character is determined and loaded into register DI of processor 20. In step 406, lines 58–83, addressability to the stored dot image is established: the location in read only storage (ROM) 27 or dynamic storage (USER RAM) 25 of the dot image of the character to be displayed is determined. After execution of Table 4, line 92, processor 20 registors DS, SI are pointing at the location in ROM 27 or RAM 25 where the character dot image is stored, and DS, SI define addressability of the dot image. At step 408, line 93 the test is made for high resolution (640×200) or medium resolution (320×200) mode, (JC means jump on carry, and is an old Intel 8080 operation code which is the same as JB/JNAE in ASM-86, which works, amazingly enough, even though JC is not a documented operation code in ASM-86.) In high resolution mode, control passes to step 410, line 95 (Table 5). For medium resolution mode, it passes to step 438, line 124 (Table 6).

For high resolution mode (640×200, black and white), the procedure of steps 412–424 (426–430 included, if pertinent) is performed for each of the four bytes required to provide the dot image for a character in graphics mode. Step 410 (line 99) sets the loop counter register DH to four, and in steps 412 (step 101) a dot image byte from ROM 27 or RAM 25 pointed to by processor 20 registers DS, SI is loaded into the processor 20 string. The LODSB and STOSB instructions at lines 101, 120 and 104, 119, etc. perform the following actions:

LODSB: MOV AL, [DS:SI]; SI←SI+1

STOSB: MOV [ES.DI], AL; DI←DI+1

At step 414 (line 102) a test is made to determine whether or not the application requesting the display of the character wants the character to replace the current display, or to be exclusive OR'd with the current display. In steps 416–422, (lines 104–115) the current display is replaced by storing this and the next dot image bytes in display buffer 34, with the next byte offset or displaced by X'2000' from the location of this byte in buffer 34. In steps 426–430 (lines 117–122), the alternative operation of exclusive ORing those two bytes into display buffer 34 is performed. If more than one identical character is to be written to display screen 50 in this operation, steps 432–434 of FIG. 5 (lines 112–114) condition the procedure for executing steps 410 through 434 for each such character.

Figure 6:
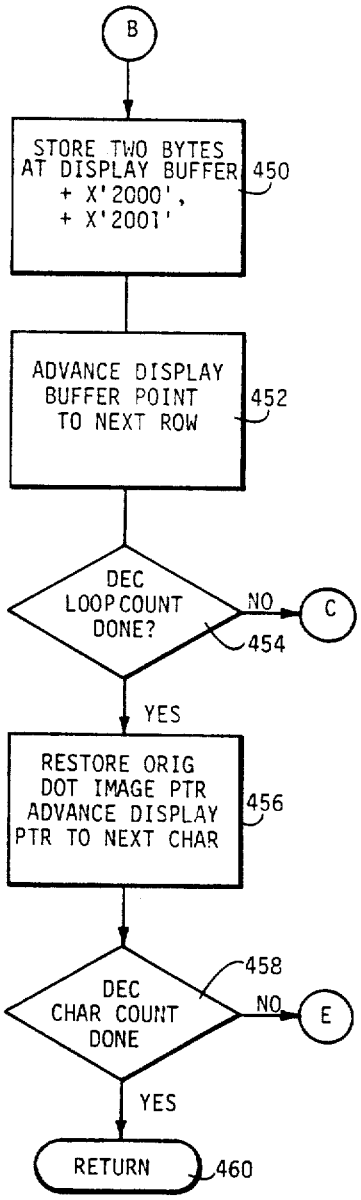
Figure 7:
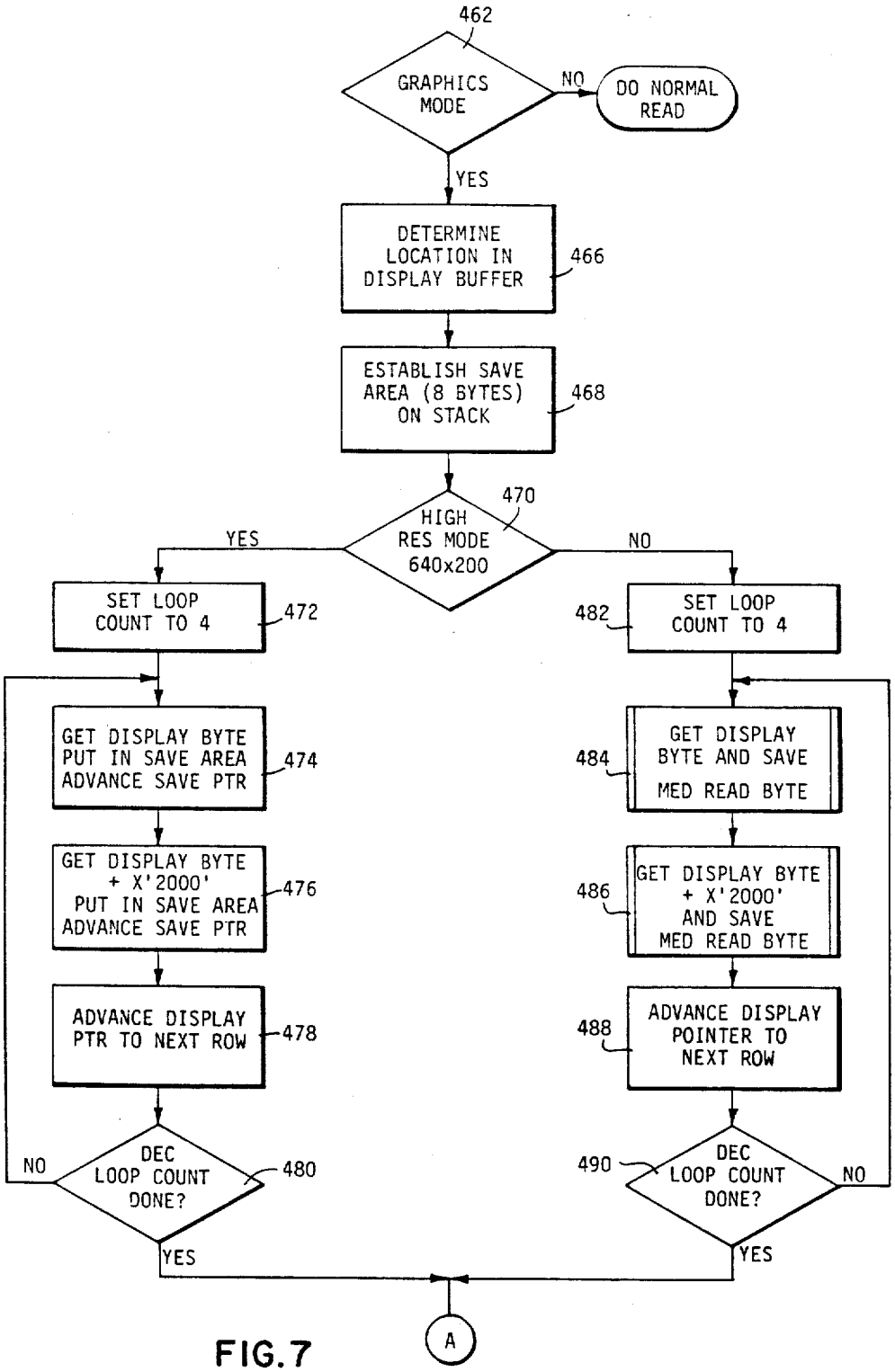
FIGS. 7–9 are logic flow diagrams of the graphics read steps of the invention.

Table 6 sets forth the 8086 assembly language listing in ROM 27 executed by processor 20 to control display attachment 31 to display a text character in the medium resolution (320×200) mode, and corresponds to steps 438 (FIG. 4) to 460 (FIG. 6).

In steps 438 (lines 128, Table 6, and Table 8) the input color (two bits, 01, 10 or 11) is expanded to fill a 16-bit word by repeating the two bit code. In step 440 (line 134), a byte of character code points are loaded into the AL register of processor 20 from storage 25, 27. In step 442, (line 135) each bit in the 1 byte AL register (character code points) is doubled up by calling EXPAND BYTE, Table 9; and the result is AND'd to the expanded input color (at line 136).

In step 444 (lines 142–143) the resulting word (2 bytes) of step 442 is stored in display buffer 34. This is shown, by way of example, at location X'O' in FIG. 2, the stored word comprising fields 301–308. (In FIG. 4, the XOR procedures of Table 6, lines 137–140 and 147–150 are not shown, but are analygous to the XOR procedure of steps 414–430 for the high resolution mode.)

In step 446 (line 144) the next dot image byte is retrieved from storage 25, 27, and at step 448 it is expanded (line 145) and AND'd with color (line 146). In step 450 (lines 152–153) the resulting word is stored in display buffer 34, offset from the word stored at step 444 by x '2000'.

At step 452 (line 154) the display buffer pointer is advanced to the next row of the character to be displayed, and processing returns (step 454, line 156) to complete the character or proceeds (step 456, 458, 460, lines 156–160) to repeat the completed character as many times as required.

Referring now to logic flow diagrams 7–9 in connection with the 8086 assembly language listings of Tables 10–12, an explanation will be given of the graphic read steps of the invention. In this process, a selected character dot image from display buffer 34 is compared against dot image code points retrieved from storage 25, 27, a match indicating that the character in buffer 34 has been identified, or read.

In step 462 it is first determined if video attachment 31 is being operated in the graphics mode. If not, in step 464 the read operation is performed in character mode, and the method of the invention is not involved.

In step 466 (line 171) the location in display buffer 34 to be read is determined by calling procedure POSITION, as set forth in Table 7. In step 468 (line 173) an 8-byte save area is established on a stack within the address space of processor 20.

In step 470 (lines 176–181) the read mode is determined. Control passes to step 482 (Table 11) for medium resolution (color, or 320×200) mode. For high resolution (black/white, or 640×200 mode, at step 472, line 187) the loop count is set to 4 (there being 4 two-byte words per character), and in steps 474–480 (lines 189–197) eight bytes are retrieved from display buffer 34 and put into the save area reserved on the stack in step 468. For medium resolution mode, at step 482 (line 203), the loop count is set equal to 4, and in steps 484–490 (lines 204–210) the character to be read is retrieved from display buffer 34. The procedure MED READ BYTE called at lines 205, 207 is set forth in Table 12 in connection with FIG. 9.

Figure 8:
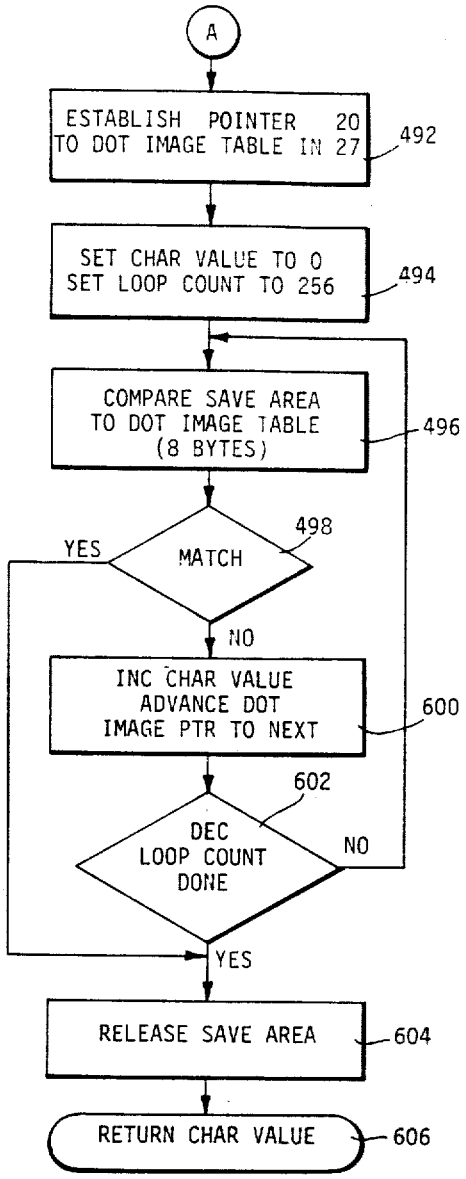

Referring to FIG. 8, at step 492 (Table 11, line 214) processing continues to compare the character, either high or medium resolution mode, read from display buffer 34 with character code points read from storage 25, 27. In step 492 (line 214) the pointer to the dot image table in ROM 27 is established. (The processing of lines 238–250 is executed if the character is not found in ROM 27 and the search must be extended into dynamic storage 25 where the user supplied second half of the graphic character points table is stored.)

In step 494 (lines 220–224) the character value is initialized to zero (it will be set equal to 1 when a match is found), and the loop count set equal to 256 (line 224 sets DX=128, and this is again, at line 249, reestablished for a total of 256 passes through the loop of steps 496–602, if required).

In step 496 (line 229), the character read from display buffer 34 into the save area is compared with the dot image read from storage 25, 27, and the match tested at step 498 (line 232). Loop control steps 600, 602 (lines 233–236) are executed until a match is found, or until all 256 dot images in storage 25, 27 have been compared with a match. In step 604 (line 255) the save area is released, and in step 606 (line 256) the procedure ends. If a character match has occurred in step 498, the character thus read is located in storage 25, 27 at the location pointed to by register AL. AL=0 if the character was not found (a not unexpected result if a character had been exclusively OR'd into the display buffer 24 at the location being read, such as at steps 426–450).

Figure 9:
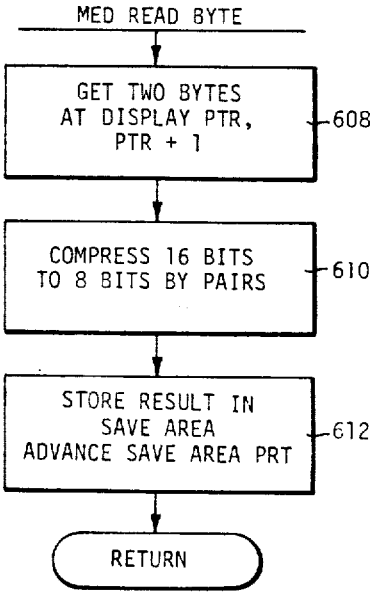

Referring now to FIG. 9 in connection with Table 12, the procedure MED READ BYTE, called at steps 484 and 486, will be described. This procedure compresses 16 bits previously expanded from eight to encode the color (see step 442) and stored in display buffer 34 (at step 444) back to the original dot image (obtained previously from storage 25, 27 at step 440). Step 608 (lines 330–331) gets two eight-bit bytes, which in step 610 (lines 332–343) is compressed two bits at a time to recover the original dot image. In step 612 (lines 344–346)

the results are saved in the area pointed to by register BP.

Figure 3:
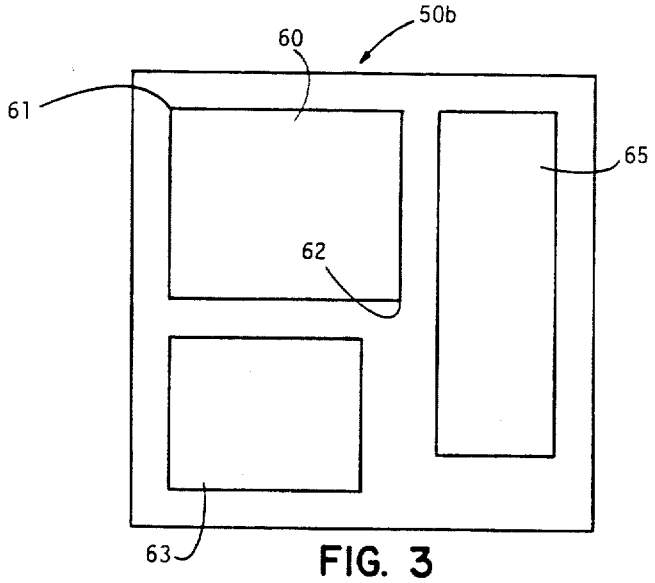
FIG. 3 is a schematic illustration of a segmented display screen for use in describing the scrolling features of the invention.
Figure 4:
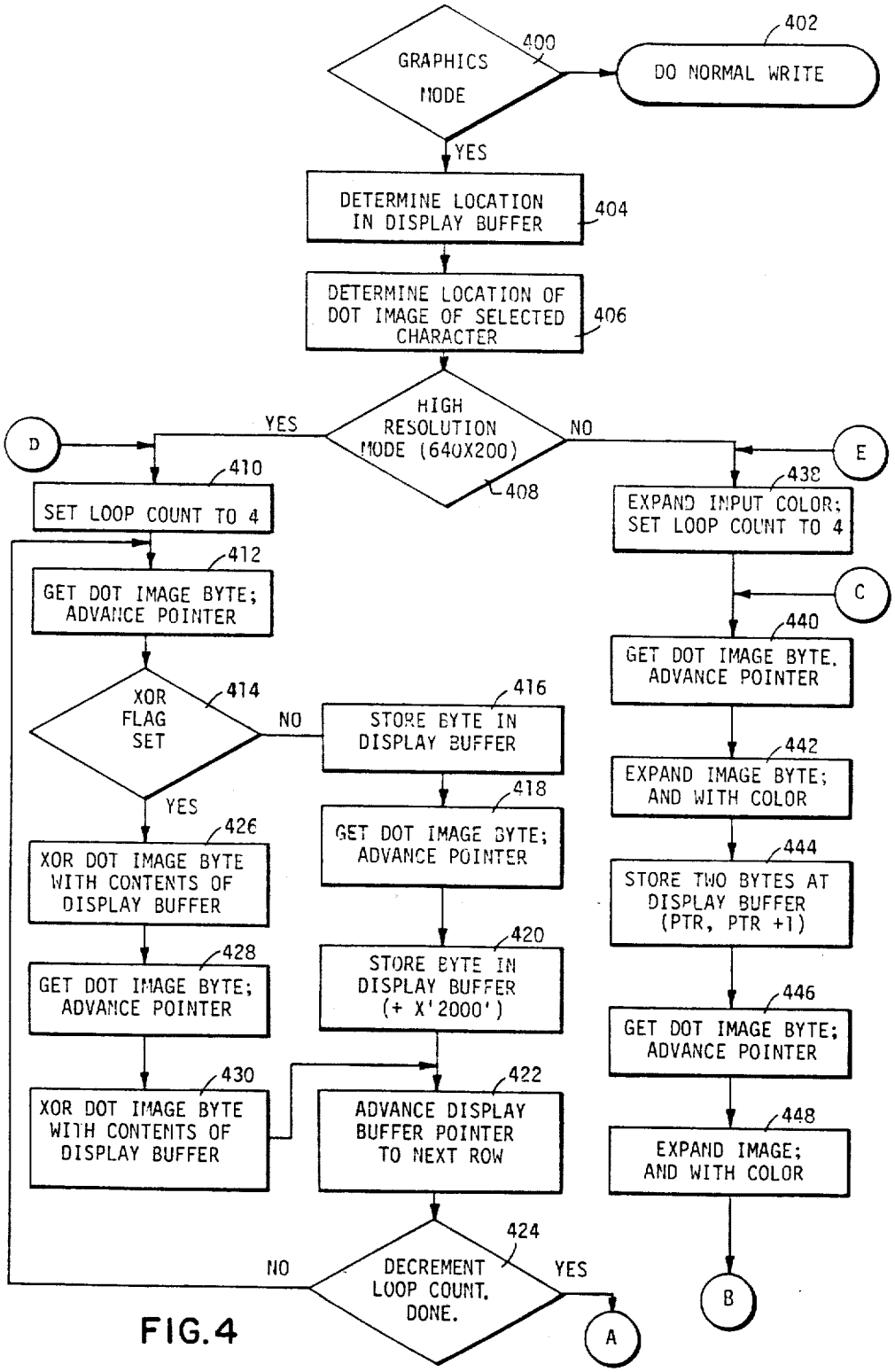
FIGS. 4–6 are logic flow diagrams of the graphics write steps of the method of the invention.
Figure 5:
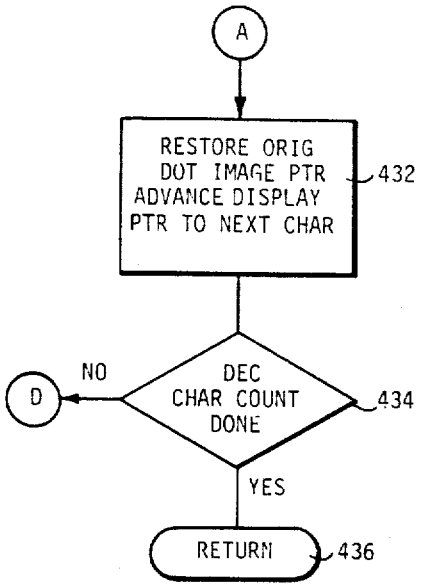

Referring now to FIG. 3, in connection with FIGS. 10–13 and Table 13, a description will be given of the graphic scrolling facility provided for separate discrete areas 60, 63, 65 of display screen 506. This invention is described and claimed in U.S. patent application Ser. No. 6/292,081, filed Aug. 12, 1981 for "Apparatus and Method for Scrolling Text Characters and Graphic Data in Selected Portions of a Graphic Display", by David J. Bradley. In accordance with this invention, a user may define a plurality of windows on the screen in which graphic information blocks may be scrolled. The designation of a scroll section or window 60 requires address of opposite corners, such as the address of the upper left corner 61 and the lower right corner 62, and the number of lines to scroll. The difference in corner addresses sets the window. The color of the newly blanked line is established by a blanking attribute. Within these parameters, the graphic scrolling procedure of FIGS. 10–13 is performed. By this approach, both text (graphic) and display may be scrolled within separate windows 60, 63, and 65.

In Table 13, certain 8086 assembly language parameters are initialized. (Reference to graphics R/W dot does not pertain to the present invention.)

Figure 10:
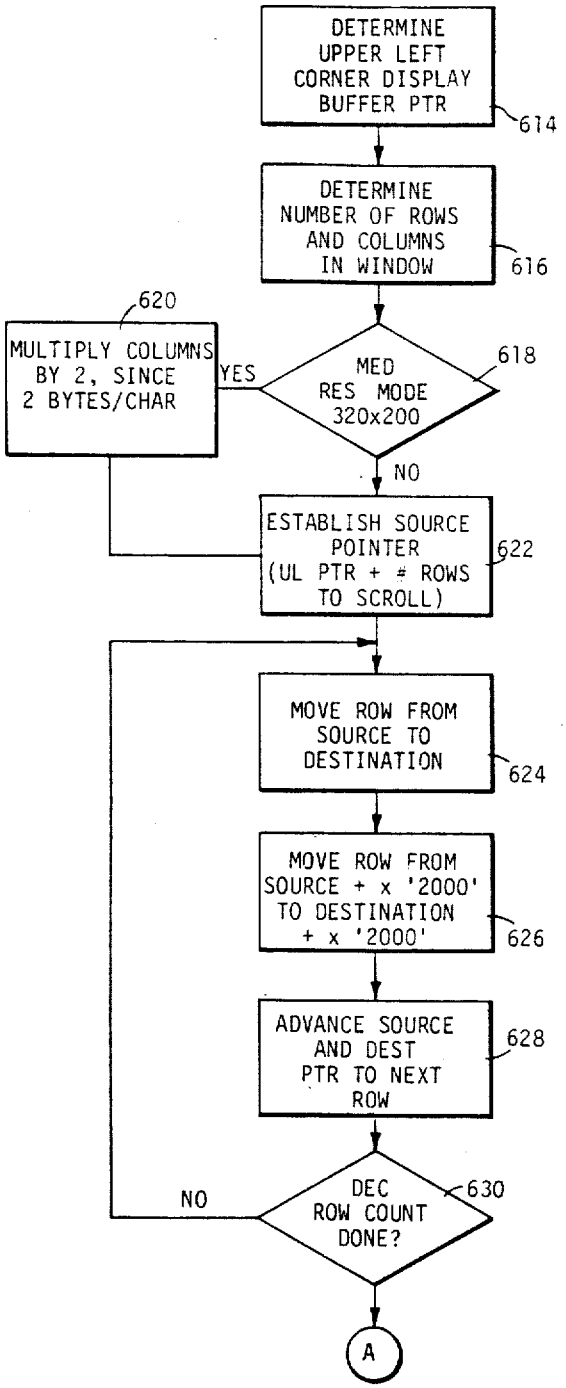
FIGS. 10–11 are logic flow diagrams of the graphics scroll up steps of the invention.
Figure 11:
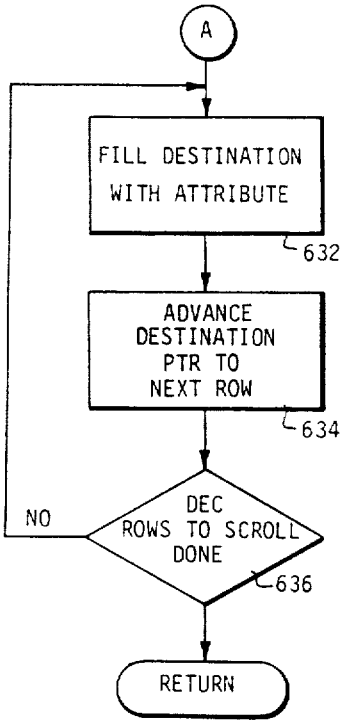

In Tables 14 and 15, the scroll up assembly language statements corresponding to FIGS. 10 and 11 are set forth. (The line numbers of Tables 13–19 overlap those of previous tables, but the step numbers of the figures do not.)

In step 614 (line 161) the pointer to the display buffer 34 location corresponding to upper left corner 61 of the display window 60 to be scrolled is placed in processor 20 register AX. In step 616 (lines 169–174) is determined the number of rows and columns in window 60. In step 618 (lines 178–179) the mode is determined, and if 320×200 mode is detected, in step 620 (lines 182–183) the number of columns in the window is adjusted to handle two bytes per character.

In step 622 (lines 185–200 of Table 15), the source pointer is established equal to upper left (UL) pointer plus the number of rows (from register AL) to scroll, the result placed in register S1.

In steps 624, 626 (line 203) a call is made to procedure ROW MOVE (Table 18) to move a row from source (pointed to by SI) to destination (pointed to by DI). Line 314 performs the move of step 624, line 322 of step 626, and lines 317–318 adjust the pointers (note line 17, Table 13—ODD FLD is equal to X'2000').

In step 628 (lines 204–205), the source (SI) and destination (DI) pointers are advanced to the next row of the screen window. In step 630 (lines 206–207) the row count is decremented and, if the process is not complete, the procedure of steps 624–630 repeated.

In step 632 (FIG. 11; line 213) procedure ROW CLEAR (Table 19) is called to clear a row by filling it with the fill value for blanked lines specified in processor 20 register BH and transferred to the AL register at line 211. The REP STOSB instruction at lines 333, 338 stores the byte contained in AL into the byte whose offset is contained in DI, increments DI, and repeats to fill every byte of the row with the blanking attribute (which may be the screen background color, for example.)

In step 634 (line 214) destination pointer DI is advanced to the next row, and in step 636 (lines 215, 216) the number BL of rows to scroll is decremented, and the loop of steps 632–636 executed for each row to be scrolled.

Figure 12:
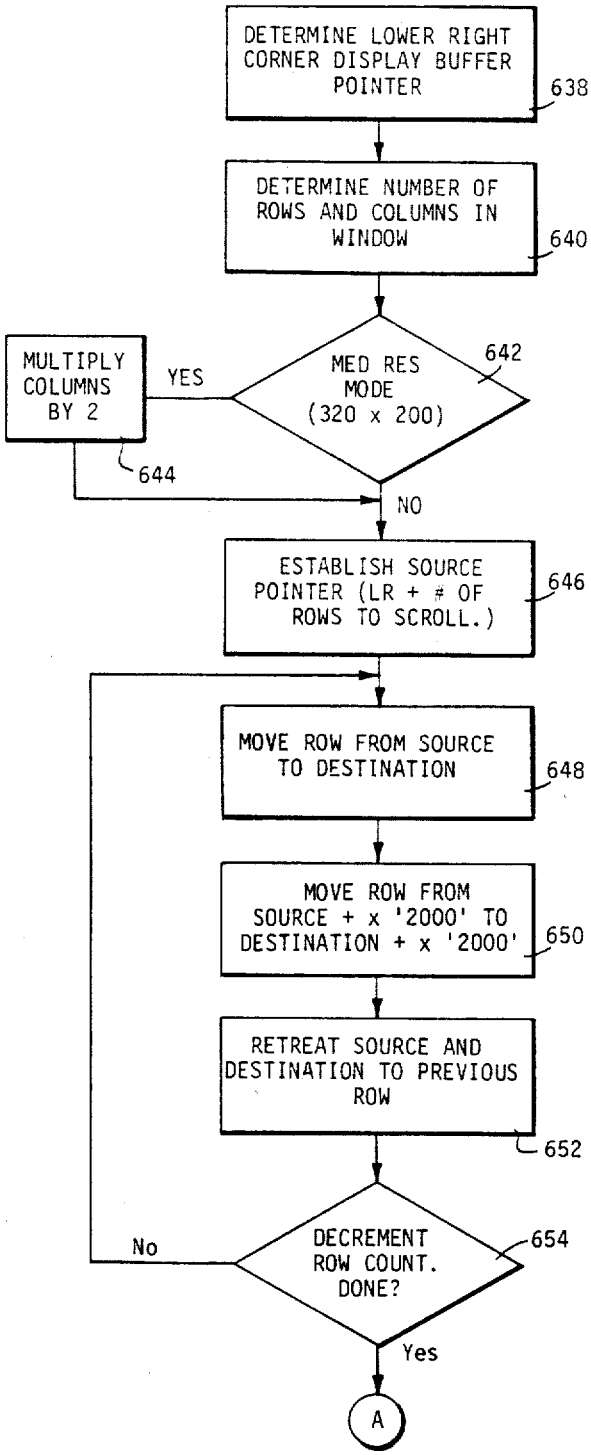
FIGS. 12–13 are logic flow diagrams of the graphics scroll down steps of the invention.
Figure 13:
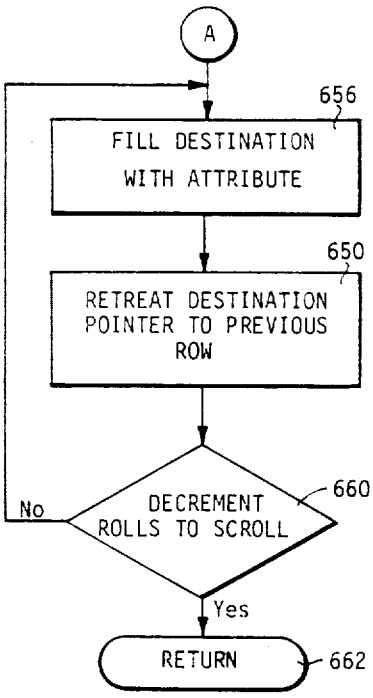

The procedure for scroll down is set forth in FIGS. 12 and 13, in connection with the 8086 assembly language source code instructions of Tables 16–19. The procedure is analogous to that for scroll up, wherever step 638 corresponds to lines 239–242, step 640 to lines 250–256, step 642 to lines 257–261, step 644 to lines 263–265, step 646 to lines 267–283, steps 648 and 650 to line 286, step 652 to lines 287–288, step 654 to lines 289–290, step 656 to line 296, step 658 to line 297, step 660 to lines 298, 299 and step 662 to line 301.

The assembly language code listings of Tables 3 through 19 are Copyrighted by IBM Corporation, 1981, and are reproduced herein by consent of IBM.

TABLE 3: GRAPHICS READ/WRITE CHARACTER INITIALIZATION

```
LINE    SOURCE
  1     $TITLE('VIDEO4 GRAPHICS READ/WRITE CHARACTER')
  2     $PAGELENGTH(43)
  3     ;-----------------------------------------------
  4     ; GRAPHICS WRITE
  5     ;  THIS ROUTINE WRITES THE ASCII CHARACTER TO THE CURRENT
  6     ;  POSITION ON THE SCREEN.
  7     ; ENTRY —
  8     ;  AL = CHARACTER TO WRITE
  9     ;  BL = COLOR ATTRIBUTE TO BE USED FOR FOREGROUND COLOR
 10     ;       IF BIT 7 IS SET, THE CHAR IS XOR'D INTO THE REGEN BUFFER
 11     ;       (0 IS USED FOR THE BACKGROUND COLOR)
 12     ;  CX = NUMBER OF CHARS TO WRITE
 13     ;  DS = DATA SEGMENT
 14     ;  ES = REGEN SEGMENT
 15     ; EXIT —
 16     ;  NOTHING IS RETURNED
 17     ;
 18     ; GRAPHICS READ
 19     ;   THIS ROUTINE READS THE ASCII CHARACTER AT THE CURRENT CURSOR
 20     ;   POSITION ON THE SCREEN BY MATCHING THE DOTS ON THE SCREEN TO THE
```

```
21    ;   CHARACTER GENERATOR CODE POINTS
22    ; ENTRY —
23    ;  NONE  ( 0 IS ASSUMED AS THE BACKGROUND COLOR
24    ; EXIT —
25    ;  AL = CHARACTER READ AT THAT POSITION (0 RETURNED IF NONE FOUND)
26    ;
27    ; FOR BOTH ROUTINES, THE IMAGES USED TO FORM CHARS ARE CONTAINED IN ROM
28    ;  FOR THE 1ST 128 CHARS.  TO ACCESS CHARS IN THE SECOND HALF, THE USER
29    ;  MUST INITIALIZE THE VECTOR AT INTERRUPT 1FH (LOCATION 0007CH) TO
30    ;  POINT TO THE USER SUPPLIED TABLE OF GRAPHIC IMAGES (8X8 BOXES).
31    ;  FAILURE TO DO SO WILL CAUSE IN STRANGE RESULTS
32    ;-----------------------------------------------
33
34    DUMMY   SEGMENT AT 0
35            ORG     01FH*4          ; LOCATION OF POINTER
36    EXT_PTR LABEL   DWORD           ; POINTER TO EXTENSION
37    DUMMY   ENDS
38
39    DATA    SEGMENT BYTE PUBLIC
40            EXTRN   CRT_COLS:WORD,CRT_MODE:BYTE,CURSOR_POSN:WORD
41    DATA    ENDS
42
43    CODE    SEGMENT BYTE PUBLIC
44            ASSUME  CS:CODE,DS:DATA,ES:DATA
45            EXTRN   CRT_CHAR_GEN:BYTE
46            EXTRN   VIDEO_RETURN:NEAR
47            PUBLIC  GRAPHICS_WRITE
48
```

TABLE 4: GRAPHICS WRITE CHARACTER

```
49    GRAPHICS_WRITE  PROC    NEAR
50            MOV     AH,0            ; ZERO TO HIGH OF CODE POINT
51            PUSH    AX              ; SAVE CODE POINT VALUE
52
53    ;------ DETERMINE POSITION IN REGEN BUFFER TO PUT CODE POINTS
54
55            CALL    POSITION        ; FIND LOCATION IN REGEN BUFFER
56            MOV     DI,AX           ; REGEN POINTER IN DI
57
58    ;------ DETERMINE REGION TO GET CODE POINTS FROM
59
60            POP     AX              ; RECOVER CODE POINT
61            CMP     AL,80H          ; IS IT IN SECOND HALF
62            JAE     EXTEND_CHAR     ; YES
63
64    ;------ IMAGE IS IN FIRST HALF, CONTAINED IN ROM
65
66            MOV     SI,OFFSET CRT_CHAR_GEN  ; OFFSET OF IMAGES
67            PUSH    CS                      ; SAVE SEGMENT ON STACK
68            JMP     SHORT DETERMINE_MODE
69
70    ;------ IMAGE IS IN SECOND HALF, IN USER RAM
71
72    EXTEND_CHAR:
73            SUB     AL,80H                  ; ZERO ORIGIN FOR SECOND HALF
74            PUSH    DS                      ; SAVE DATA POINTER
75            SUB     SI,SI
76            MOV     DS,SI                   ; ESTABLISH VECTOR ADDRESSING
```

```
77          ASSUME  DS:DUMMY
78          LDS     SI,EXT_PTR              ; GET THE OFFSET OF THE TABLE
79          MOV     DX,DS                   ; GET THE SEGMENT OF THE TABLE
80          ASSUME  DS:DATA
81          POP     DS                      ; RECOVER DATA SEGMENT
82          PUSH    DX                      ; SAVE TABLE SEGMENT ON STACK
83
84    ;------ DETERMINE GRAPHICS MODE IN OPERATION
85
86    DETERMINE_MODE:
87          SAL     AX,1                    ; MULTIPLY CODE POINT
88          SAL     AX,1                    ;  VALUE BY 8
89          SAL     AX,1
90          ADD     SI,AX                   ; SI HAS OFFSET OF DESIRED CODES
91          CMP     CRT_MODE,6
92          POP     DS                  ; RECOVER TABLE POINTER SEGMENT
93          JC      MED_RES_WRITE       ; TEST FOR MEDIUM RESOLUTION MODE
94
```

TABLE 5: GRAPHICS WRITE CHARACTER 640x200 BLACK/WHITE MODE

```
95    ;------ HIGH RESOLUTION MODE
96    HIGH_CHAR:
97          PUSH    DI                  ; SAVE REGEN POINTER
98          PUSH    SI                  ; SAVE CODE POINTER
99          MOV     DH,4                ; NUMBER OF TIMES THROUGH LOOP
100   L10:
101         LODSB                       ; GET BYTE FROM CODE POINTS
102         TEST    BL,80H              ; SHOULD WE USE THE FUNCTION
103         JNZ     XOR_HIGH            ;  TO PUT CHAR IN
104         STOSB                       ; STORE IN REGEN BUFFER
105         LODSB
106   L10A:                             ;
107         MOV     ES:[DI+2000H-1],AL      ; STORE IN SECOND HALF
108         ADD     DI,79               ; MOVE TO NEXT ROW IN REGEN
109         DEC     DH                  ; DONE WITH LOOP
110         JNZ     L10
111         POP     SI
112         POP     DI                  ; RECOVER REGEN POINTER
113         INC     DI                  ; POINT TO NEXT CHAR POSITION
114         LOOP    HIGH_CHAR               ; MORE CHARS TO WRITE
115         JMP     VIDEO_RETURN
116
117   XOR_HIGH:                         ;
118         XOR     AL,ES:[DI]          ; EXCLUSIVE OR WITH CURRENT
119         STOSB                       ; STORE THE CODE POINT
120         LODSB                       ; AGAIN FOR ODD FIELD
121         XOR     AL,ES:[DI+2000H-1]      ;
122         JMP     L10A                ; BACK TO MAINSTREAM
123
```

TABLE 6: GRAPHICS WRITE CHARACTER 320X200 COLOR MODE

```
124   ;------ MEDIUM RESOLUTION WRITE
125   MED_RES_WRITE:
126         MOV     DL,BL               ; SAVE HIGH COLOR BIT
127         SAL     DI,1                ; OFFSET*2 SINCE 2 BYTES/CHAR
128         CALL    EXPAND_MED_COLOR        ; EXPAND BL TO FULL WORD OF COLOR
129   MED_CHAR:
130         PUSH    DI                  ; SAVE REGEN POINTER
131         PUSH    SI                      ; SAVE THE CODE POINTER
```

```
        MOV     DH,4            ; NUMBER OF LOOPS
L20:
        LODSB                   ; GET CODE POINT
        CALL    EXPAND_BYTE     ; DOUBLE UP ALL THE BITS
        AND     AX,BX           ; CONVERT THEM TO FOREGROUND COLOR ( 0 BACK )
        TEST    DL,80H          ; IS THIS XOR FUNCTION
        JZ      L20A            ; NO, STORE IT IN AS IT IS
        XOR     AH,ES:[DI]      ; DO FUNCTION WITH HALF
        XOR     AL,ES:[DI+1]    ;  AND WITH OTHER HALF
L20A:                           ;
        MOV     ES:[DI],AH      ; STORE FIRST BYTE
        MOV     ES:[DI+1],AL    ; STORE SECOND BYTE

        LODSB                   ; GET CODE POINT
        CALL    EXPAND_BYTE
        AND     AX,BX           ; CONVERT TO COLOR
        TEST    DL,80H          ; AGAIN, IS THIS XOR FUNCTION
        JZ      L20B            ; NO, JUST STORE THE VALUES
        XOR     AH,ES:[DI+2000H]        ; FUNCTION WITH FIRST HALF
        XOR     AL,ES:[DI+2001H]        ; AND WITH SECOND HALF
L20B:                           ;
        MOV     ES:[DI+2000H],AH
        MOV     ES:[DI+2000H+1],AL      ; STORE IN SECOND PORTION OF BUFFER
        ADD     DI,80           ; POINT TO NEXT LOCATION
        DEC     DH
        JNZ     L20             ; KEEP GOING
        POP     SI              ; RECOVER CODE POINTER
        POP     DI              ; RECOVER REGEN POINTER
        ADD     DI,2            ; POINT TO NEXT CHAR POSITION
        LOOP    MED_CHAR        ; MORE TO WRITE
        JMP     VIDEO_RETURN

GRAPHICS_WRITE  ENDP
```

TABLE 7: POSITION

```
;-----------------------------------
; POSITION
;  THIS ROUTINE TAKES THE CURSOR POSITION CONTAINED IN
;  THE MEMORY LOCATION, AND CONVERTS IT INTO AN OFFSET
;  INTO THE REGEN BUFFER, ASSUMING ONE BYTE/CHAR.
;  FOR MEDIUM RESOLUTION GRAPHICS, THE NUMBER MUST
;  BE DOUBLED.
; ENTRY -- NO REGISTERS,MEMORY LOCATION CURSOR_POSN IS USED
; EXIT--
;  AX CONTAINS OFFSET INTO REGEN BUFFER
;-----------------------------------

        PUBLIC  GRAPH_POSN
POSITION        PROC    NEAR
        MOV     AX,CURSOR_POSN          ; GET CURRENT CURSOR
GRAPH_POSN      LABEL   NEAR

        PUSH    BX                      ; SAVE REGISTER
        MOV     BX,AX                   ; SAVE A COPY OF CURRENT CURSOR
        MOV     AL,AH                   ; GET ROWS TO AL
        MUL     BYTE PTR CRT_COLS       ; MULTIPLY BY BYTES/COLUMN
        SHL     AX,1                    ; MULTIPLY * 4 SINCE 4 ROWS/BYTE
        SHL     AX,1
        SUB     BH,BH                   ; ISOLATE COLUMN VALUE
        ADD     AX,BX                   ; DETERMINE OFFSET
```

```
373         POP     BX                      ; RECOVER POINTER
374         RET                             ; ALL DONE
375     POSITION        ENDP
376     CODE    ENDS
377         END
```

TABLE 8: EXPAND MED COLOR

```
259     ;-----------------------------------------------
260     ; EXPAND_MED_COLOR
261     ;  THIS ROUTINE EXPANDS THE LOW 2 BITS IN BL TO
262     ;  FILL THE ENTIRE BX REGISTER
263     ; ENTRY --
264     ;  BL = COLOR TO BE USED ( LOW 2 BITS )
265     ; EXIT --
266     ;  BX = COLOR TO BE USED ( 8 REPLICATIONS OF THE 2 COLOR BITS )
267     ;-----------------------------------------------
268
269     EXPAND_MED_COLOR        PROC    NEAR
270         AND     BL,3            ; ISOLATE THE COLOR BITS
271         MOV     AL,BL           ; COPY TO AL
272         PUSH    CX              ; SAVE REGISTER
273         MOV     CX,3            ; NUMBER OF TIMES TO DO THIS
274     EXPAND_MED:
275         SAL     AL,1
276         SAL     AL,1            ; LEFT SHIFT BY 2
277         OR      BL,AL           ; ANOTHER COLOR VERSION INTO BL
278         LOOP    EXPAND_MED      ; FILL ALL OF BL
279         MOV     BH,BL           ; FILL UPPER PORTION
280         POP     CX              ; REGISTER BACK
281         RET                     ; ALL DONE
282     EXPAND_MED_COLOR        ENDP
283
```

TABLE 9: EXPAND BYTE

```
284     ;-----------------------------------------------
285     ; EXPAND_BYTE
286     ;  THIS ROUTINE TAKES THE BYTE IN AL AND DOUBLES ALL
287     ;  OF THE BITS, TURNING THE 8 BITS INTO 16 BITS.
288     ;  THE RESULT IS LEFT IN AX
289     ;-----------------------------------------------
290
291     EXPAND_BYTE     PROC    NEAR
292         PUSH    DX              ; SAVE REGISTER
293         PUSH    CX
294         PUSH    BX
295         MOV     DX,0            ; RESULT REGISTER
296         MOV     CX,1            ; MASK REGISTER
297     EXPAND_BYTE_LOOP:
298         MOV     BX,AX           ; BASE INTO TEMP
299         AND     BX,CX           ; USE MASK TO EXTRACT A BIT
300         OR      DX,BX           ; PUT INTO RESULT REGISTER
301         SHL     AX,1
302         SHL     CX,1            ; SHIFT BASE AND MASK BY 1
303         MOV     BX,AX           ; BASE TO TEMP
304         AND     BX,CX           ; EXTRACT THE SAME BIT
305         OR      DX,BX           ; PUT INTO RESULT
306         SHL     CX,1            ; SHIFT ONLY MASK NOW, MOVING TO NEXT BASE
307         JNC     EXPAND_BYTE_LOOP        ; USE MASK BIT COMING OUT TO TERMINATE
308         MOV     AX,DX           ; RESULT TO FARM REGISTER
309         POP     BX
```

```
310             POP     CX              ; RECOVER REGISTERS
311             POP     DX
312             RET                     ; ALL DONE
313     EXPAND_BYTE     ENDP
```

TABLE 10: GRAPHICS READ CHARACTER (HIGH RESOLUTION)

```
164
165     ;-----------------------------------
166     ; GRAPHICS READ
167     ;-----------------------------------
168             PUBLIC  GRAPHICS_READ
169     GRAPHICS_READ   PROC    NEAR
170
171             CALL    POSITION        ; CONVERTED TO OFFSET IN REGEN
172             MOV     SI,AX           ; SAVE IN SI
173             SUB     SP,8            ; ALLOCATE SPACE TO SAVE THE READ CODE POINT
174             MOV     BP,SP           ; POINTER TO SAVE AREA
175
176     ;------ DETERMINE GRAPHICS MODES
177
178             CMP     CRT_MODE,6
179             PUSH    ES
180             POP     DS              ; POINT TO REGEN SEGMENT
181             JC      MED_RES_READ    ; MEDIUM RESOLUTION
182
183     ;------ HIGH RESOLUTION READ
184
185     ;------ GET VALUES FROM REGEN BUFFER AND CONVERT TO CODE POINT
186     HIGH_READ:
187             MOV     DH,4            ; NUMBER OF PASSES
188     L100:
189             MOV     AL,[SI]         ; GET FIRST BYTE
190             MOV     [BP],AL         ; SAVE IN STORAGE AREA
191             INC     BP              ; NEXT LOCATION
192             MOV     AL,[SI+2000H]   ; GET LOWER REGION BYTE
193             MOV     [BP],AL         ; ADJUST AND STORE
194             INC     BP
195             ADD     SI,80           ; POINTER INTO REGEN
196             DEC     DH              ; LOOP CONTROL
197             JNZ     L100            ; DO IT SOME MORE
198             JMP     FIND_CHAR       ; GO MATCH THE SAVED CODE POINTS
199
```

TABLE 11: GRAPHICS READ CHARACTER (MEDIUM RESOLUTION)

```
200     ;------- MEDIUM RESOLUTION READ
201     MED_RES_READ:
202             SAL     SI,1            ; OFFSET*2 SINCE 2 BYTES/CHAR
203             MOV     DH,4            ; NUMBER OF PASSES
204     L110:
205             CALL    MED_READ_BYTE   ; GET PAIR BYTES FROM REGEN INTO SINGLE SAVE
206             ADD     SI,2000H        ; GO TO LOWER REGION
207             CALL    MED_READ_BYTE   ; GET THIS PAIR INTO SAVE
208             SUB     SI,2000H-80     ; ADJUST POINTER BACK INTO UPPER
209             DEC     DH
210             JNZ     L110            ; KEEP GOING UNTIL ALL 8 DONE
211
212     ;-------- SAVE AREA HAS CHARACTER IN IT, MATCH IT
```

```
FIND_CHAR:
        MOV     DI,OFFSET CRT_CHAR_GEN  ; ESTABLISH ADDRESSING TO CODE POINTS
        PUSH    CS
        POP     ES                      ; CODE POINTS IN CS
        SUB     BP,8                    ; ADJUST POINTER TO BEGINNING OF SAVE AREA
        MOV     SI,BP
        CLD                             ; ENSURE DIRECTION
        MOV     AL,0                    ; CURRENT CODE POINT BEING MATCHED
L190:
        PUSH    SS                      ; ESTABLISH ADDRESSING TO STACK
        POP     DS                      ; FOR THE STRING COMPARE
        MOV     DX,128                  ; NUMBER TO TEST AGAINST
L200:
        PUSH    SI                      ; SAVE SAVE AREA POINTER
        PUSH    DI                      ; SAVE CODE POINTER
        MOV     CX,8                    ; NUMBER OF BYTES TO MATCH
        REPE    CMPSB                   ; COMPARE THE 8 BYTES
        POP     DI                      ; RECOVER THE POINTERS
        POP     SI
        JZ      FOUND                   ; IF ZERO FLAG SET, THEN MATCH OCCURRED
        INC     AL                      ; NO MATCH, MOVE ON TO NEXT
        ADD     DI,8                    ; NEXT CODE POINT
        DEC     DX                      ; LOOP CONTROL
        JNZ     L200                    ; DO ALL OF THEM

;------ CHAR NOT MATCHED, MIGHT BE IN USER SUPPLIED SECOND HALF

        CMP     AL,0                    ; AL<> 0 IF ONLY 1ST HALF SCANNED
        JE      FOUND                   ; IF = 0, THEN ALL HAS BEEN SCANNED
        SUB     AX,AX
        MOV     DS,AX                   ; ESTABLISH ADDRESSING TO VECTOR
        ASSUME  DS:DUMMY
        LES     DI,EXT_PTR              ; GET POINTER
        MOV     AX,ES                   ; SEE IF THE POINTER REALLY EXISTS
        OR      AX,DI                   ; IF ALL 0, THEN DOESN'T EXIST
        JZ      FOUND                   ; NO SENSE LOOKING
        MOV     AL,128                  ; ORIGIN FOR SECOND HALF
        JMP     L190                    ; GO BACK AND TRY FOR IT
        ASSUME  DS:DATA

;------ CHARACTER IS FOUND ( AL=0 IF NOT FOUND )
FOUND:
        ADD     SP,8                    ; READJUST THE STACK, THROW AWAY SAVE
        JMP     VIDEO_RETURN            ; ALL DONE
GRAPHICS_READ   ENDP
```

TABLE 12: MED READ BYTE

```
;-----------------------------------------------
; MED_READ_BYTE
; THIS ROUTINE WILL TAKE 2 BYTES FROM THE REGEN BUFFER,
;  COMPARE AGAINST THE CURRENT FOREGROUND COLOR, AND PLACE
;  THE CORRESPONDING ON/OFF BIT PATTERN INTO THE CURRENT
```

```
320     ;  POSITION IN THE SAVE AREA
321     ; ENTRY --
322     ;  SI,DS = POINTER TO REGEN AREA OF INTEREST
323     ;  BX = EXPANDED FOREGROUND COLOR
324     ;  BP = POINTER TO SAVE AREA
325     ; EXIT --
326     ;  BP IS INCREMENT AFTER SAVE
327     ;-----------------------------------------------
328
329     MED_READ_BYTE   PROC    NEAR
330             MOV     AH,[SI]         ; GET FIRST BYTE
331             MOV     AL,[SI+1]       ; GET SECOND BYTE
332             MOV     CX,0C000H       ; 2 BIT MASK TO TEST THE ENTRIES
333             MOV     DL,0            ; RESULT REGISTER
334     L300:
335             TEST    AX,CX           ; IS THIS SECTION BACKGROUND?
336             CLC                     ; CLEAR CARRY IN HOPES THAT IT IS
337             JZ      L310            ; IF ZERO, IT IS BACKGROUND
338             STC                     ; WASN'T, SO SET CARRY
339     L310:
340             RCL     DL,1            ; MOVE THAT BIT INTO THE RESULT
341             SHR     CX,1
342             SHR     CX,1            ; MOVE THE MASK TO THE RIGHT BY 2 BITS
343             JNC     L300            ; DO IT AGAIN IF MASK DIDN'T FALL OUT
344             MOV     [BP],DL         ; STORE RESULT IN SAVE AREA
345             INC     BP              ; ADJUST POINTER
346             RET                     ; ALL DONE
347     MED_READ_BYTE   ENDP
348
```

TABLE 13: VIDEO3 GRAPHICS

```
LINE    SOURCE
  1     $TITLE('VIDEO3 GRAPHICS R/W DOT -- SCROLL UP/DOWN')
  2     $PAGELENGTH(43)
  3     ;-----------------------------------------
  4     ; THIS MODULE CONTAINS THE ROUTINES USED DURING GRAPHICS OPERATIONS
  5     ; THE ROUTINES INCLUDE:
  6     ;  READ/WRITE DOT
  7     ;  SCROLL UP/DOWN
  8     ;-----------------------------------------
  9
 10     DATA    SEGMENT BYTE PUBLIC
 11             EXTRN   CRT_MODE:BYTE,CRT_COLS:BYTE
 12     DATA    ENDS
 13
 14     CODE    SEGMENT BYTE PUBLIC
 15             ASSUME  CS:CODE,DS:DATA,ES:DATA
 16             EXTRN   VIDEO_RETURN:NEAR
 17     ODD_FLD EQU     2000H           OFFSET TO ODD FIELD OF GRAPHICS
 18
```

TABLE 14: SCROLL UP - PART 1

```
142     ;-----------------------------------------------
143     ; SCROLL UP
144     ;  THIS ROUTINE SCROLLS UP THE INFORMATION ON THE CRT
145     ; ENTRY --
```

```
146     ;  CH,CL = UPPER LEFT CORNER OF REGION TO SCROLL
147     ;  DH,DL = LOWER RIGHT CORNER OF REGION TO SCROLL
148     ;   BOTH OF THE ABOVE ARE IN CHARACTER POSITIONS
149     ;  BH = FILL VALUE FOR BLANKED LINES
150     ;  AL = # LINES TO SCROLL (AL=0 MEANS BLANK THE ENTIRE FIELD)
151     ;  DS = DATA SEGMENT
152     ;  ES = REGEN SEGMENT
153     ; EXIT --
154     ;  NOTHING, THE SCREEN IS SCROLLED
155     ;-----------------------------------------------------------
156             PUBLIC  GRAPHICS_UP,GRAPHICS_DOWN
157             EXTRN   GRAPH_POSN:NEAR
158
159     GRAPHICS_UP     PROC    NEAR
160             MOV     BL,AL   ; SAVE LINE COUNT IN BL
161             MOV     AX,CX   ; GET UPPER LEFT POSITION INTO AX REG
162
163     ;------ USE CHARACTER SUBROUTINE FOR POSITIONING
164     ;------ ADDRESS RETURNED IS MULTIPLIED BY 2 FROM CORRECT VALUE
165
166             CALL    GRAPH_POSN
167             MOV     DI,AX           ; SAVE RESULT AS DESTINATION ADDRESS
168
169     ;------ DETERMINE SIZE OF WINDOW
170
171             SUB     DX,CX
172             ADD     DX,101H         ; ADJUST VALUES
173             SAL     DH,1            ; MULTIPLY # ROWS BY 4 SINCE 8 VERT DOTS/CHAR
174             SAL     DH,1            ;  AND EVEN/ODD ROWS
175
176     ;------ DETERMINE CRT MODE
177
178             CMP     CRT_MODE,6      ; TEST FOR MEDIUM RES
179             JNC     FIND_SOURCE
180
181     MED_RES_UP:
182             SAL     DL,1            ; # COLUMNS * 2, SINCE 2 BYTES/CHAR
183             SAL     DI,1            ; OFFSET *2 SINCE 2 BYTES/CHAR
184
```

TABLE 15: SCROLL UP - PART 2

```
185     ;------ DETERMINE THE SOURCE ADDRESS IN THE BUFFER
186     FIND_SOURCE:
187             PUSH    ES              ; GET SEGMENTS BOTH POINTING TO REGEN
188             POP     DS
189             SUB     CH,CH           ; ZERO TO HIGH OF COUNT REG
190             SAL     BL,1            ; MULTIPLY NUMBER OF LINES BY 4
191             SAL     BL,1
192             JZ      BLANK_FIELD     ; IF ZERO, THEN BLANK ENTIRE FIELD
193             MOV     AL,BL           ; GET NUMBER OF LINES IN AL
194             MOV     AH,80           ; 80 BYTES/ROW
195             MUL     AH              ; DETERMINE OFFSET TO SOURCE
196             MOV     SI,DI           ; SET UP SOURCE
197             ADD     SI,AX           ;  ADD IN OFFSET TO IT
198             MOV     AH,DH           ; NUMBER OF ROWS IN FIELD
199             SUB     AH,BL           ; DETERMINE NUMBER TO MOVE
200
201     ;------ LOOP THROUGH, MOVING ONE ROW AT A TIME, BOTH EVEN AND ODD FIELDS
```

```
ROW_LOOP:
        CALL    ROW_MOVE                ; MOVE ONE ROW
        SUB     SI,ODD_FLD-80   ; MOVE TO NEXT ROW
        SUB     DI,ODD_FLD-80
        DEC     AH              ; NUMBER OF ROWS TO MOVE
        JNZ     ROW_LOOP        ; CONTINUE TILL ALL MOVED

;------- FILL IN THE VACATED LINE(S)
CLEAR_ENTRY:
        MOV     AL,BH           ; ATTRIBUTE TO FILL WITH
CLEAR_LOOP:
        CALL    ROW_CLEAR       ; CLEAR THAT ROW
        SUB     DI,ODD_FLD-80   ; POINT TO NEXT LINE
        DEC     BL              ; NUMBER OF LINES TO FILL
        JNZ     CLEAR_LOOP
        JMP     VIDEO_RETURN    ; EVERYTHING DONE

BLANK_FIELD:
        MOV     BL,DH           ; SET BLANK COUNT TO EVERYTHING IN FIELD
        JMP     CLEAR_ENTRY     ; CLEAR THE FIELD
GRAPHICS_UP     ENDP
$EJECT
```

TABLE 16: SCROLL DOWN - PART 1

```
LINE    SOURCE

;-----------------------------------------------------
; SCROLL DOWN
;  THIS ROUTINE SCROLLS DOWN THE INFORMATION ON THE CRT
; ENTRY --
;  CH,CL = UPPER LEFT CORNER OF REGION TO SCROLL
;  DH,DL = LOWER RIGHT CORNER OF REGION TO SCROLL
;   BOTH OF THE ABOVE ARE IN CHARACTER POSITIONS
;  BH = FILL VALUE FOR BLANKED LINES
;  AL = # LINES TO SCROLL (AL=0 MEANS BLANK THE ENTIRE FIELD)
;  DS = DATA SEGMENT
;  ES = REGEN SEGMENT
; EXIT --
;  NOTHING, THE SCREEN IS SCROLLED
;-----------------------------------------------------

GRAPHICS_DOWN   PROC    NEAR
        STD             ; SET DIRECTION
        MOV     BL,AL   ; SAVE LINE COUNT IN BL
        MOV     AX,DX   ; GET LOWER RIGHT POSITION INTO AX REG

;------ USE CHARACTER SUBROUTINE FOR POSITIONING
;------- ADDRESS RETURNED IS MULTIPLIED BY 2 FROM CORRECT VALUE

        CALL    GRAPH_POSN
        MOV     DI,AX           ; SAVE RESULT AS DESTINATION ADDRESS

;------- DETERMINE SIZE OF WINDOW

        SUB     DX,CX
```

```
253         ADD     DX,101H         ; ADJUST VALUES
254         SAL     DH,1            ; MULTIPLY # ROWS BY 4 SINCE 3 VERT DOTS/CHAR
255         SAL     DH,1            ;  AND EVEN/ODD ROWS
256
257 ;------ DETERMINE CRT MODE
258
259         CMP     CRT_MODE,6      ; TEST FOR MEDIUM RES
260         JNC     FIND_SOURCE_DOWN
261
262 MED_RES_DOWN:
263         SAL     DL,1            ; # COLUMNS * 2, SINCE 2 BYTES/CHAR (OFFSET OK)
264         SAL     DI,1            ; OFFSET *2 SINCE 2 BYTES/CHAR
265         INC     DI              ; POINT TO LAST BYTE
266
```

TABLE 17: SCROLL DOWN - PART 2

```
267 ;------ DETERMINE THE SOURCE ADDRESS IN THE BUFFER
268 FIND_SOURCE_DOWN:
269         PUSH    ES              ; BOTH SEGMENTS TO REGEN
270         POP     DS
271         SUB     CH,CH           ; ZERO TO HIGH OF COUNT REG
272         ADD     DI,240          ; POINT TO LAST ROW OF PIXELS
273         SAL     BL,1            ; MULTIPLY NUMBER OF LINES BY 4
274         SAL     BL,1
275         JZ      BLANK_FIELD_DOWN        ; IF ZERO, THEN BLANK ENTIRE FIELD
276         MOV     AL,BL           ; GET NUMBER OF LINES IN AL
277         MOV     AH,80           ; 80 BYTES/ROW
278         MUL     AH              ; DETERMINE OFFSET TO SOURCE
279         MOV     SI,DI           ; SET UP SOURCE
280         SUB     SI,AX           ;  SUBTRACT THE OFFSET
281         MOV     AH,DH           ; NUMBER OF ROWS IN FIELD
282         SUB     AH,BL           ; DETERMINE NUMBER TO MOVE
283
284 ;------ LOOP THROUGH, MOVING ONE ROW AT A TIME, BOTH EVEN AND ODD FIELDS
285 ROW_LOOP_DOWN:
286         CALL    ROW_MOVE        ; MOVE ONE ROW
287         SUB     SI,ODD_FLD+80   ; MOVE TO NEXT ROW
288         SUB     DI,ODD_FLD+80
289         DEC     AH              ; NUMBER OF ROWS TO MOVE
290         JNZ     ROW_LOOP_DOWN   ; CONTINUE TILL ALL MOVED
291
292 ;------ FILL IN THE VACATED LINE(S)
293 CLEAR_ENTRY_DOWN:
294         MOV     AL,BH           ; ATTRIBUTE TO FILL WITH
295 CLEAR_LOOP_DOWN:
296         CALL    ROW_CLEAR       ; CLEAR A ROW
297         SUB     DI,ODD_FLD+80   ; POINT TO NEXT LINE
298         DEC     BL              ; NUMBER OF LINES TO FILL
299         JNZ     CLEAR_LOOP_DOWN
300         CLD                     ; RESET THE DIRECTION FLAG
301         JMP     VIDEO_RETURN    ; EVERYTHING DONE
302
303 BLANK_FIELD_DOWN:
```

```
304          MOV     BL,DH            ; SET BLANK COUNT TO EVERYTHING IN FIELD
305          JMP     CLEAR_ENTRY_DOWN        ; CLEAR THE FIELD
306    GRAPHICS_DOWN  ENDP
307
```

TABLE 18: ROW MOVE

```
308    ;------ ROUTINE TO MOVE ONE ROW OF INFORMATION
309
310    ROW_MOVE       PROC    NEAR
311          MOV     CL,DL            ; NUMBER OF BYTES IN THE ROW
312          PUSH    SI
313          PUSH    DI               ; SAVE POINTERS
314          REP     MOVSB            ; MOVE THE EVEN FIELD
315          POP     DI
316          POP     SI
317          ADD     SI,ODD_FLD
318          ADD     DI,ODD_FLD               ; POINT TO THE ODD FIELD
319          PUSH    SI
320          PUSH    DI               ; SAVE THE POINTERS
321          MOV     CL,DL            ; COUNT BACK
322          REP     MOVSB            ; MOVE THE ODD FIELD
323          POP     DI
324          POP     SI               ; POINTERS BACK
325          RET                      ; RETURN TO CALLER
326    ROW_MOVE       ENDP
```

TABLE 19: ROW CLEAR

```
327
328    ;------ CLEAR A SINGLE ROW
329
330    ROW_CLEAR      PROC    NEAR
331          MOV     CL,DL            ; NUMBER OF BYTES IN FIELD
332          PUSH    DI               ; SAVE POINTER
333          REP     STOSB            ; STORE THE NEW VALUE
334          POP     DI               ; POINTER BACK
335          ADD     DI,ODD_FLD               ; POINT TO ODD FIELD
336          PUSH    DI
337          MOV     CL,DL
338          REP     STOSB            ; FILL THE ODD FILELD
339          POP     DI
340          RET                      ; RETURN TO CALLER
341    ROW_CLEAR      ENDP
342    CODE    ENDS
343          END
```

While the invention has been described with respect to preferred embodiments thereof, it is to be understood that the foregoing and other modifications and variations may be made without departing from the scope and spirit thereof.

I claim:

[1. A raster scan video display control apparatus of the type including a graphic video display refresh buffer operable in an all points addressable mode for refreshing said display with graphics data, a processor for writing graphic data into said display refresh buffer, and a character storage for storing the character dot patterns of a display character font, characterized by:

means for selecting a character to be displayed; and programmable control means referenced by said processor for (1) loading from said storage into said graphic video display refresh buffer a character dot pattern corresponding to the character to be displayed;

(2) expanding the selected character dot pattern into a predetermined pixel format and then color encoding the expanded dot pattern to establish a resultant expanded/encoded dot pattern; and (3) loading said expanded/encoded dot pattern into said graphic video display refresh buffer.]

[2. A raster scan video display control apparatus of the type including a graphic video display refresh buffer operable in an all points addressable mode for refreshing said display with graphics data, a processor for writing graphic data into said display refresh buffer, and a character storage for storing the character dot patterns of a display character font, characterized by:

means for selecting a character to be displayed; and programmable control means referenced by said processor selectively for loading from said storage into said graphic video display refresh buffer a character dot pattern corresponding to the character to be displayed and for reading a previously displayed character by comparing a character dot pattern previously loaded into said graphic video display buffer with successive character dot patterns selected from said character storage.]

3. A method for writing a text character on a raster scan all points addressable video display, comprising the steps of:

retrieving from storage the graphic dot image of the character to be written;

expanding said graphic image to a selected pixel and color format; and storing the expanded dot image in a display refresh buffer.

4. A method for reading a selected text character previously written as an expanded dot image into a display refresh buffer from a graphic dot image stored in a storage associated with an all points addressable video display, comprising the steps of:

retrieving from said display refresh buffer the expanded dot image of the selected character to be read;

converting the expanded dot image to be read to a converted dot image corresponding to the format of graphic dot image in the storage;

obtaining from storage the graphic dot image of a comparison character;

comparing the dot image of the comparison character with said converted dot image; and repeating the obtaining and comparing steps until the dot image of the comparison character matches said converted dot image.

5. A method for operating a computing apparatus that controls a graphics display to write a text character onto a display screen, the computing appartus including a processor referencing a store, and a display refresh buffer, characterized in that the method comprises the steps of:

establishing addressability to the location in said display refresh buffer to receive a selected display text character;

establishing addressability to the location in said store containing a dot image of said selected display text character;

fetching one portion of said dot image from said store;

expanding said portion of said dot image according to a selected pixel format to provide an expanded dot image portion;

modifying said expanded dot image portion to encode a desired color; and storing the expanded dot image portion as modified in said display refresh buffer; and repeating said fetching, expanding, modifying and storing steps for each portion of said dot image to load into said display refresh buffer the selected display text character.

6. The method of claim [7,] *5,* characterized by the steps of:

refreshing a raster scan display with alternate raster scan lines refreshed from offset locations of said display refresh buffer; and storing alternating dot image portions in offset locations of said display refresh buffer as part of said storing step.

7. The method of claim [7,] *5,* characterized in that said storing step is performed by exclusive 'ORing each dot image portion with a corresponding portion of said modified expanded dot image previously stored in said display refresh buffer.

8. The method of claim 5, characterized in that said expanding step and said modifying step are for the purpose of writing a text character in color and said expanding step and modifying step are eliminated when writing the text character in black and white.

9. A method for operating a computing apparatus that controls a graphics display to read a text character previously written onto said graphics display, the computing apparatus including a processor referencing a store, and a display refresh buffer, comprising the steps of:

retrieving from said display refresh buffer a dot image of the character to be read;

storing the dot image of the character to be read in a save area in said store;

sequentially retrieving from said store respective dot images of possible display text characters and comparing each respective dot image with the dot image in the save area; and repeating the retrieving and comparing steps until a respective dot image matches the dot image in said save area, thereby concluding reading of the text characters.

*10. A raster scan video display control apparatus of the type including a graphic video display refresh buffer operable in an all points addressable mode for refreshing said display with graphics data, a processor for writing graphics data into said display refresh buffer, and a character storage for storing the character dot patterns of a display character font, comprising means for selecting a character to be displayed, and means for loading from said storage into said graphic video display refresh buffer a character dot pattern corresponding to the character to be displayed and for reading a previously displayed character by comparing*

*a character dot pattern previously loaded into said graphic video display buffer with successive character dot patterns selected from said character storage.*

*11. A raster scan video display control apparatus of the type including a graphic video display refresh buffer for refreshing said display with graphics data, a processor for writing graphics data into said display refresh buffer, and a character storage for storing the character dot patterns of a display character font, comprising means for selecting a character to be displayed, means for reading out said character from said character storage in a first format, means for expanding the selected character dot pattern into a predetermined pixel format and then color encoding the expanded dot pattern to establish a resultant expanded/encoded dot pattern, and loading said expanded/encoded dot pattern into said graphic video display refresh buffer.*

*12. In a display apparatus for writing a text character onto a video display and including a means for retrieving the graphic dot image of the character to be written from a character storage, the improvement comprising means for expanding a retrieved graphic dot image into a selected pixel and color format, and means for storing the expanded dot image in a display refresh buffer.*

*13. Video display control apparatus of the type including a video display buffer for holding information patterns directly specifying the tracing of patterns on a display screen, a processor for writing information patterns into said buffer, and font storage means for storing a font of displayable information patterns, characterized by:*

*means for selecting code representations of patterns to be displayed;*

*means responsive to said selected representations for extracting first information patterns corresponding to said patterns extracted from said font storage means;*

*means for converting said extracted first patterns into corresponding second information patterns for producing the same display patterns as said first patterns but with a different image characteristic; and*

*means for entering said second information patterns into said display buffer.*

*14. Video display control apparatus of the type including a video display buffer for holding information patterns directly specifying the tracing of image patterns on a display screen, a processor for writing information patterns, into said buffer, and font storage means for storing a font of displayable information patterns, characterized by:*

*means for selecting code representations of image patterns to be displayed;*

*means responsive to said selected representations for extracting corresponding information patterns from said font storing means;*

*means responsive to said extracting means for storing information patterns corresponding to said extracted patterns in said display buffer;*

*means for reading information pattern patterns from said display buffer; and*

*means coupled to said reading means and said font storage means for converting information patterns read from said buffer into corresponding code representations.*

*15. Video display control apparatus in accordance with claim 14 wherein said converting means comprises:*

*means for comparing each information pattern read from said display buffer with patterns stored in said font storage means; and*

*means responsive to a match between patterns compared by said comparing means for developing a code representation corresponding to the matched pattern.*

*16. Video display control apparatus in accordance with claim 14 wherein said means for storing corresponding patterns in said display buffer comprises:*

*means for converting each pattern extracted from said font storage into a corresponding pattern having a different display image characteristic than the extracted pattern; and*

*means for writing such corresponding patterns into said display buffer.*

*17. A method for creating image displays of information patterns comprising:*

*forming code representations of information patterns to be displayed;*

*converting said code representations into corresponding first information patterns corresponding to images to be displayed;*

*converting said first information patterns into second information patterns for directly controlling the tracing of associated image patterns on an image display; said second information patterns having associated image characteristics different from those of the respective first information patterns; and*

*storing said second information patterns in a display buffer capable of directly controlling the formation of images on an image display.*

*18. A method for creating image displays of information patterns comprising:*

*forming code representations of information patterns to be displayed;*

*converting said code representations into corresponding information patterns to be displayed;*

*storing said information patterns in a display buffer capable of directly controlling the formation of images on an image display;*

*reading information patterns from said display buffer; and*

*converting said information patterns read from said display buffer into corresponding code representations.*

*19. The display formation method of claim 18 wherein: said step of converting said code representations into corresponding information patterns comprises:*

*converting each code representation into a first associated information pattern having a first associated image formation characteristic; and*

*converting each first associated information pattern into a different second information pattern having an associated second image formation characteristic different from the respective first characteristic.*

*20. The display formation method of claim 19 wherein said step of converting said information patterns into code representations comprises:*

*converting each information pattern into a corresponding standardized information pattern having a different image formation characteristic; and*

*converting each said corresponding pattern into a corresponding standardized code representation.*

* * * * *

UNITED STATES PATENT AND TRADEMARK OFFICE

CERTIFICATE OF CORRECTION

PATENT NO. : Re 32,201

DATED : July 8, 1986

INVENTOR(S) : David J. Bradley

It is certified that error appears in the above-identified patent and that said Letters Patent is hereby corrected as shown below:

Column 34, line 32, in claim 7, line 3, change "said" to --a--;

Column 35, line 56, in claim 14, line 15, delete "pattern".

Signed and Sealed this

Twelfth Day of February, 1991

*Attest:*

HARRY F. MANBECK, JR.

*Attesting Officer*

*Commissioner of Patents and Trademarks*

REEXAMINATION CERTIFICATE (1108th)

United States Patent [19]

Bradley

[11] B1 Re. 32,201

[45] Certificate Issued Aug. 1, 1989

[54] APPARATUS AND METHOD FOR READING AND WRITING TEXT CHARACTERS IN A GRAPHICS DISPLAY

[75] Inventor: David J. Bradley, Boca Raton, Fla.

[73] Assignee: International Business Machines Corp., Armonk, N.Y.

Reexamination Request:
No. 90/001,645, Nov. 23, 1988

Reexamination Certificate for:

| | |
|---|---|
| Patent No.: | **Re. 32,201** |
| Issued: | **Jul. 8, 1986** |
| Appl. No.: | **638,340** |
| Filed: | **Aug. 6, 1984** |

Related U.S. Patent Documents

Reissue of:

| | |
|---|---|
| [64] Patent No.: | **4,408,200** |
| Issued: | **Oct. 4, 1983** |
| Appl. No.: | **292,084** |
| Filed: | **Aug. 12, 1981** |

[51] Int. Cl.[4] ..... G09G 1/28

[52] U.S. Cl. ..... 340/747; 340/703; 340/750

[58] Field of Search ..... 340/703, 747, 750

[56] References Cited

U.S. PATENT DOCUMENTS

| | | |
|---|---|---|
| 3,293,614 | 12/1966 | Fenimore et al. . |
| 3,312,953 | 4/1967 | Wang et al. . |
| 3,668,687 | 6/1972 | Hale . |
| 3,778,810 | 12/1973 | Hayashi . |
| 3,873,972 | 3/1975 | Levine . |
| 3,895,357 | 7/1975 | Schwartz et al. . |
| 3,906,480 | 9/1975 | Schwartz et al. . |
| 3,967,268 | 6/1976 | Roberts . |
| 4,012,735 | 3/1977 | Keane . |
| 4,026,555 | 5/1977 | Kirschner et al. . |
| 4,063,232 | 12/1977 | Fernald . |
| 4,078,249 | 3/1978 | Lelke et al. . |
| 4,094,000 | 6/1978 | Brudevold . |
| 4,149,145 | 4/1979 | Hartke et al. . |
| 4,180,805 | 12/1979 | Burson . |
| 4,197,590 | 4/1980 | Sukonick et al. . |
| 4,225,586 | 9/1980 | Langdon, Jr. et al. . |
| 4,250,056 | 2/1981 | Haag et al. . |
| 4,272,276 | 6/1981 | Lacy . |
| 4,283,724 | 8/1981 | Edwards . |
| 4,297,693 | 10/1981 | Parsons . |
| 4,298,895 | 11/1981 | Duvall et al. . |
| 4,330,834 | 5/1982 | Murphy . |
| 4,338,599 | 7/1982 | Leininger . |
| 4,342,029 | 7/1982 | Hofmanis et al. . |
| 4,394,650 | 7/1983 | Long et al. . |
| 4,404,552 | 9/1983 | Hirahata et al. . |
| 4,520,356 | 5/1985 | O'Keefe et al. . |

FOREIGN PATENT DOCUMENTS

| | | |
|---|---|---|
| 3046972 | 9/1981 | Fed. Rep. of Germany . |

OTHER PUBLICATIONS

William M. Newman, Robert F. Sproul, "Principles of Interactive Computer Graphics"; 2nd Ed., McGraw-Hill Book 1979, pp. 220–223, 251, 277–281.

Robert F. Sproull, "Raster Graphics for Interactive Programming Environments"; ACM (1979), pp. 83–93.

Motorola Semiconductor Product Description MC 6845-CRT Controller, copyrighted 1977.

Computer Graphics in Color (P. B. Denes) Bell Laboratories Record, May 1974, pp. 139–146.

B. E. Bliss et al., "Time-Shared Communication with Key-CRT Display Terminals", 3/73, IBM Technical Disclosure Bulletin, vol. 15, No. 10, 3/73, pp. 3056–3059.

A. J. Heimsoth, "Display of Characters on a Graphic System", 1/80, pp. 3544–3546, IBM Technical Disclosure Bulletin, V22, N8B.

D. C. Clarke, "Method for Correlating Graphical Data on a Interactive Display", 4/79, pp. 4658–4659, IBM Technical Disclosure Bulletin, V21, No. 11.

D. P. Attwood, "Variable-Size Buffer Control for Plotted Graphic Output", 3/78, pp. 4157–4158, IBM Technical Disclosure Bulletin, V20, No. 10.

D. A. Kummer, "All-Points-Addressable Raster Scan Graphics for Cathode Ray Tube with Dual-Ported Bit Map", 1/81, pp. 3553–3555, IBM Technical Disclosure Bulletin, V23, N8.

R. A. Schulz, "Interactive Graphics Terminal": 10/80, pp. 1770–1779, IBM Technical Disclosure Bulletin, V23, N5.

R. K. DeBry, "Character Graphics Using Programmable Character Font", 10/80, pp. 2001–2002 IBM Technical Disclosure Bulletin, V23, N5.

R. K. DeBry et al, "Enhanced Display Extended Character and Graphics Functions", 10/80, pp. 2003–2004, IBM Technical Disclosure Bulletin, V23, N5.

*Primary Examiner*—David L. Trafton

[57] ABSTRACT

Apparatus and method for writing text characters to a raster scan video display operted in an all-points-addressable, or graphics, mode, and for reading characters thus written. A graphic video display buffer directly refreshes the display with graphics data received from a microprogrammed processor. The processor writes a character to the display by selecting and loading into the graphics video display buffer a text character dot pattern retrieved from main storage, and reads a character previously written by comparing a dot pattern retrieved from the display buffer with dot patterns retrieved from main storage. To write a character to the display in color, the graphic dot image of a selected character retrieved from main storage is expanded to a selected pixel and color format, and stored in the graphics video display buffer. Text characters thus written in color are read by retrieving from the display buffer the expanded dot image, restoring the expanded dot image to its original form, and comparing the restored dot image with graphic dot images retrieved from storage.

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 4, 9, 10, 14–16 and 18–20 is confirmed.

Claims 1 and 2 were previously cancelled.

Claims 3, 5, 11–13 and 17 are determined to be patentable as amended.

Claims 6–8, dependent on an amended claim are determined to be patentable.

3. A method for writing a text character on a raster scan all points addressable video display, comprising the steps of:

retrieving from storage the graphic dot image of the *text* character to be written, *each dot being represented by a single bit;* expanding said graphic *dot* image to a selected pixel and color format *by duplicating each bit and logically combining the bits representing each dot with encoded color information*; and storing the expanded dot image *by placing the bits representing each dot* in *contiguous address memory locations in* a display refresh buffer.

5. A method for operating a computing apparatus that controls a graphics display to write a text character onto a display screen, the computing apparatus including a processor referencing a store, and a display refresh buffer *comprising a plurality of memory locations*, characterized in that the method comprises the steps of:

establishing addressability to the location in said display refresh buffer to receive a selected display text character;

establishing addressability to the location in said store containing a dot image of said selected display text character;

fetching one portion of said dot image from said store, *each dot being represented by a single bit;* expanding said portion of said dot image according to a selected pixel format *by duplicating each bit* to provide an expanded dot image portion;

modifying said expanded dot image portion *by logically combining the bits representing each dot with encoded color information to provide an encoded color dot image portion* [to encode a desired color]; and storing the [expanded] *bits representing each dot in the encoded color* dot image portion [as modified] in *contiguous address memory locations in* said display refresh buffer; and repeating said fetching, expanding, modifying and storing steps for each portion of said dot image to load into said display refresh buffer the selected display text character.

11. A raster scan video display control apparatus of the type including a graphic video display refresh buffer *comprising a plurality of memory locations* for refreshing said display with graphics data, a processor for writing graphics data into said display refresh buffer, and a character storage for storing the character dot patterns of a display character font, comprising means for selecting a character to be displayed, means for reading out said character from said character storage in a first *dot* format *comprising one bit per dot*, means for expanding *by duplicating* the selected character dot pattern into a predetermined pixel format *comprising two identical bits per pixel* and then color encoding the expanded dot pattern *by logically combining encoded color information with said expanded dot pattern* to establish a resultant expanded/encoded dot pattern, and loading *the bits representing each dot of* said expanded/encoded dot pattern into *contiguous address memory locations in* said graphic video display refresh buffer.

12. In a display apparatus for writing a text character onto a video display and including a means for retrieving the graphic dot image of the character to be written from a character storage, *each dot in said image being represented by a single bit*, the improvement comprising means forexpanding a retrieved graphic dot image into a selected pixel and color format *by duplicating each bit n times and logically combining the n bits representing each dot with n bits of encoded color infomation, where n is an integer*, and means for storing the expanded dot image in a display refresh buffer *by entering the n bits representing each dot of said expanded dot image into n contiguous address memory locations.*

13. Video display control apparatus of the type including a video display buffer *having a plurality of memory locations* for holding information patterns directly specifying the tracing of *multi-element* patterns on a display screen, a processor for writing information patterns into said buffer, and font storage means for storing a font of displayable information patterns, characterized by:

means for selecting code representations of patterns to be displayed;

means responsive to said selected representations for extracting first *multi-element* information patterns corresponding to said *multi-element* patterns extracted from said font storage means, *each element of said first patterns being represented by a first number of bits n, where n is an integer;* means for converting said extracted first patterns into corresponding second *multi-element* information patterns, *each element of said second patterns being represented by a second number of bits 2n*, for producing the same display patterns as said first patterns but with a different image characteristic; and means for entering said second *multi-element* information patterns into said display buffer *by storing the 2n bits representing each element of said second patterns in 2n contiguous address memory locations.*

17. A method for creating image displays of *multi-element* information patterns comprising:

forming code representations of *said multi-element* information patterns to be displayed, *each element being represented by a first number of bits;* converting said code representations into corresponding first *multi element* information patterns corresponding to images to be displayed, *each element being represented by a second number of bits greater than said first number of bits;* converting said first *multi-element* information patterns into second *multi-element* information patterns for directly controlling the tracing of associated image patterns on an image display *by logically combining attribute information encoded in a second number of bits with the bit representation for each element of said second multi-element information patterns*; said second information patterns having associated image characteristics different from those of the respective first information patterns; and storing said second information patterns in *contiguous address memory locations of* a display buffer capable of directly controlling the information of images on an image display.

* * * * *